(12) United States Patent
Ims et al.

(10) Patent No.: US 7,634,726 B2
(45) Date of Patent: Dec. 15, 2009

(54) TECHNIQUE FOR AUTOMATED E-BUSINESS SERVICES

(75) Inventors: Steven D. Ims, Apex, NC (US); Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2171 days.

(21) Appl. No.: 09/754,891

(22) Filed: Jan. 5, 2001

(65) Prior Publication Data

US 2002/0091533 A1    Jul. 11, 2002

(51) Int. Cl.
*G06F 17/00* (2006.01)
(52) U.S. Cl. .......................... 715/249; 715/234
(58) Field of Classification Search ................. 715/523, 715/249, 201, 234, 236, 239; 705/1
See application file for complete search history.

(56) References Cited

U.S. PATENT DOCUMENTS

| | | | | |
|---|---|---|---|---|
| 6,205,466 | B1* | 3/2001 | Karp et al. | 718/104 |
| 6,493,712 | B1* | 12/2002 | Karp et al. | 707/6 |
| 2002/0120704 | A1* | 8/2002 | Karp et al. | 709/207 |
| 2003/0154171 | A1* | 8/2003 | Karp et al. | 705/78 |

OTHER PUBLICATIONS

Karp, A., "E-speak E-xplained," Hewlett-Packard Company, Jul. 31, 2000, teaching an overview of E-Speak.*
Winsor, G., "The E-services Revolution—the next evolution of the Internet," Hewlett-Packard, Dec. 6, 2000, power-point slide overview of E-Speak with graphics.*
W3C, "Authoring Tool Accessibility Guidelines 1.0," Oct. 26, 1999, teaching guidelines for web authoring.*
Balakrishnan, R., "A Service Framework Specification for Dynamic e-services interaction," Hewlett-Packard Co., 2000, teaching integration of e-service systems.*
"Cocoon, version 1.6-dev." Java Apache Project, downloaded from: http://web.archive.org/web/19991111100042/java.apache.org/cocoon/index.html (and linked pages), downloaded pp. 1-61.*
La Quey, R., "SML: Simplifying XML," XML.com, Nov. 24, 1999, downloaded from www.xml.com/print/1999/11/sml/index.html, pp. 1-5.*
"VerticalNet OSM Platform, Service Publisher User's Guide, Preview Release," VerticalNet Solutions, VerticalNet, Dec. 31, 2000, cover, copyright, and contents pages, pp. 1-36.*
"e" speak Tutorial, Version: Beta 20.2 Hewlett-Packard Company, Dec. 1999, previously provided to Applicants.*
"Business to business integration with trading partner agreements", www.ibm.com/software/big/papers, 12 pages.

* cited by examiner

*Primary Examiner*—Laurie Ries
(74) *Attorney, Agent, or Firm*—Stevens & Showalter LLP

(57) ABSTRACT

The present invention provides a method, system, computer program product, and method of doing business with automated electronic business ("e-business") services by using a structured markup language processing engine and structured markup language documents. The structured markup language, which in the preferred embodiment is the Extensible Markup Language ("XML"), is used to describe the data and processing invocations to perform in carrying out e-business services (which may include invocation of a number of sub-services), and to automatically synchronize the interactions that are necessary in carrying out the service. The interactions may involve multiple business partners.

26 Claims, 12 Drawing Sheets

FIG. 6

```
<eServiceDefinition>
  <ServiceUnit name="..." ...">
    <description> ... </description>
    <actions> ... </actions>
    <nextServices>
      <service> ... </service>
      ...
    </nextServices>
  </ServiceUnit>
  <ServiceUnit name="..." ...">
    ...
  </ServiceUnit>
</eServiceDefinition>
```

TECHNIQUE FOR AUTOMATED E-BUSINESS SERVICES

BACKGROUND OF THE INVENTION

1. Field of the Invention

The present invention relates to computer software, and deals more particularly with a method, system, computer program product, and method of doing business with automated electronic business services by using a structured markup language processing engine and structured markup language documents. The disclosed techniques may also be used advantageously for automating other types of applications that can be described using finite state machines.

2. Reservation of Copyright

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

3. Description of the Related Art

The market for electronic business-to-business, or "B2B", commerce is growing rapidly, and has tremendous opportunities for improving business efficiency and profitability. This market is predicted to reach trillions of dollars per annum in the near future. At the same time, the electronic business-to-consumer, or "B2C", market is also increasing substantially.

B2B and B2C commerce may be referred to more generally as electronic commerce or electronic business (or equivalently, "e-commerce" or "e-business"). To enable wide support for e-business, it is necessary to have cost-efficient application software that supports business transactions. One prior art technique for electronically exchanging information between businesses is EDI (Electronic Data Interchange), which has been in use for a number of years. However, EDI support is relatively expensive to provide, and the protocols used in EDI transactions are not easily extended for new business applications. EDI has therefore not been widely utilized for providing e-business solutions in today's Internet and World Wide Web (hereinafter, "Web") environments.

A more commonly-used technique for providing e-business solutions is for business partners to electronically exchange information using electronic documents encoded in a structured notation such as the Extensible Markup Language ("XML"). XML is often used to represent the data content being exchanged, and may also be used to specify what type of request or response is being transmitted within the scope of a particular business application. (As an example, an XML document may contain markup tags indicating to the receiving application that the document contains data for a purchase order by using an attribute and value such as Request_Type="purch_order".) When XML is used to specify a request for a business service or a response thereto, the manner in which the service and its associated information processing is actually carried out remains hidden from the partner which initiates the request, but the implementation at the receiving partner is often quite complex. Similarly, in B2C transactions, the details of carrying out a consumer's request may be quite complex, but the client software used by the consumer is typically shielded from this level of detail and may interface with the back-end application by simply formatting the request in the proper manner.

The actual implementation of an e-business service may require execution of many sub-services, each of which may also invoke sub-services. Furthermore, the sub-services may initiate interactions with other business partners, including the original initiator of the service request. Therefore, defining and managing the service implementation for carrying out e-business transactions, including the interactions of the required sub-services, can be a very challenging problem.

Prior art techniques for implementing e-business solutions typically require intensive programming efforts. For example, programming that is customized to a particular business application is required for integrating the sub-services of the application such that a service is properly executed. Sophisticated tools are often required to assist the programmer, and a tight dependency will be created between the generated code and the run-time system infrastructure. The portability, reusability, and cost associated with using the resulting solution creates another problem.

One approach for specifying data and process interaction protocols that is currently being used in the industry for e-business solutions is to use trading partner agreements. A trading partner agreement, or "TPA", is a document that describes the general contract terms and other parameters under which two or more business partners will communicate electronically for a particular set of business transactions. For example, the communication and security protocols to be used for electronic interchanges must be specified and agreed upon, including the types and formats of messages that are valid, codes and parameter values to be used in those messages, and so forth. Structured markup languages derived from XML are being defined and standardized for expressing TPAs, in order to enable businesses to automate the TPA exchange process. Example notations include "tpaML" (Trading Partner Agreement Markup Language) and "cXML" (Commerce XML).

When using tpaML, for example, one business partner creates a TPA (using either a text editor of some type, or perhaps a specialized TPA creation software tool), and sends an electronic copy of the resulting tpaML document to a second business partner. The second business partner adds its own information to the tpaML document (such as a bank account number for use in transactions covered by this TPA, the range of dates for which the TPA is in effect, etc.), and returns the tpaML document to the originating partner. Once a complete and agreed-upon TPA has been created, the tpaML document is processed by a code generator at each business partner's site to produce software to control subsequent B2B transactions between these partners for this computing application.

tpaML was originally developed by the International Business Machines Corporation (IBM), and is now being standardized by the Electronic Business XML Initiative or "ebXML". ebXML is an organization devoted to defining global e-business standards, and is sponsored by the United Nations and the Organization for the Advancement of Structured Information Standards, or "OASIS". For more information on tpaML, see http://www.ebxml.org on the Internet.

cXML, on the other hand, is used to define information about a product in order to standardize the exchange of catalog content and to define the request/response processes (such as purchase orders, payment transactions, etc.) for secure electronic transactions. (For more information on cXML, refer to www.cxml.org.)

While use of tpaML offers a number of advantages, it does not provide a complete solution for automating B2B and B2C transactions. For example, electronic interchange of tpaML documents and tool-generated code based upon the TPA content provides only a mechanism for interfacing the content of the TPA to existing business applications: it does not provide refinement for integrating the business data used by a service or the interactions for a set of services and sub-services that may be invoked during execution of the underlying business application software that supports a transaction among trading partners. (For example, the code generated from a tpaML document may convert the trading partner's bank account information into the format expected by an existing business application, and store the converted information in a particular predetermined location; create a billing parameters file in which the trading partner's billing information is stored, using the format expected by the existing business application; and so forth. However, the generated code does not provide procedures for such as ensuring that the bank account is valid before accepting a payment transaction: application-specific code must be provided to integrate the processing of this type of information into the overall application. Furthermore, the generated code does not provide procedures for accepting and coordinating input data for a transaction, nor for initiating the payment logic only after a complete order has been assembled, and so forth.)

More importantly, code generation tools generate code with dependencies to specific infrastructures or frameworks. The need to separate out the business logic that controls the data and process exchange flows was not contemplated nor accounted for in such tools. Thus, it is not easy to share a common piece of exchange business logic among different partner systems. This is also true within a business's own system environment if the framework or infrastructure is not the same throughout, such as when organizations are consolidated from business mergers. Handling of system growth issues such as service redirection, content redistribution, and server upgrades could become overly complex in such environments.

In addition, the requirement for processing tpaML documents with a code generator means that any changes to the TPA in place between business partners requires repeating this generation process, which may in turn require complex and expensive regression testing, code archiving, and administrative procedures. Furthermore, the tpaML approach may not extend well to the B2C marketplace, as the creation of TPA information may be too complex for the average consumer and the code generation software may not be readily adaptable to the client environment in the client-server paradigm typically used in B2C computing.

Another prior art technique that may be used with e-business transactions is to use a software work flow system. Examples include the FlowMark® and MQ Workflow products from IBM. ("FlowMark" is a registered trademark of IBM.) When using work flow as a modeling tool, a Flow Control Model (FCM) can be used by a business partner to visually define the interaction flows with other trading partners. The result can be an FCM formatted file which then needs to be further processed into a script file that specifies the particular service definition. However, a work flow tool is used primarily as a general programming concept such as flowcharting or structured programming. For example, building a model of business processes involves defining the processes, the work flow participants in particular organizations, and the information technology resources needed to implement the work flow. To complete the model, the domain expert must add processing logic, assign staff to a process, write customized code, attach the programs to the model, add data, and add information technology resources. After the model is completed, it needs to be imported and compiled into a form required for the run-time environment of the modeling tool, where execution of the processes will be driven from the tool's server components (or run-time environment). Such is the nature of a typical work flow system. There are several limitations with using work flow systems, however. The run-time environment of each modeling tool is typically proprietary, and thus is better suited to use in intra-company applications where the modeling tool will be readily available than for use in e-business transactions among different companies. In addition, work flow modeling tools tend to use proprietary data formats, which are also not well suited to the needs of e-business in an open distributed networking environment. Furthermore, user code must typically be plugged in to a complex and proprietary object model when using work flow modeling tools (often requiring the writing of application-specific integration code), in order to provide an executable application.

No prior art techniques are known to the inventors that support integrating services provided by different business partners to a transaction and integrating different information from multiple sources (such as the responses generated when various sub-services are invoked): typically, this type of integration must be provided by writing application-specific code. It would be preferable to have a technique for defining and managing e-business services and their interrelationships that could automatically integrate the underlying processing without writing customized software for each e-business application. Furthermore, this technique should be based upon non-proprietary data formats, protocols, and so forth, in order to assure wide acceptance in a global marketplace. Such a technique would make the tasks of developing and administering e-business solutions much easier and less expensive. As a result, the benefits of e-business would be available to more businesses, yielding significant benefits to the B2B and B2C marketplace.

Accordingly, what is needed is an improved technique for defining and carrying out automated e-business services that is easily adaptable to a wide variety of business applications, that does not require intensive programming for each particular application, and that is cost-efficient and independent of the infrastructure implementation of individual business partner systems.

SUMMARY OF THE INVENTION

An object of the present invention is to provide a technique for automated e-business interactions that is easily adaptable to wide variety of business applications.

Another object of the present invention is to provide a technique for separating the business logic that controls the data and process exchange interactions from the supporting infrastructure that may be provided by a wide variety of middleware systems.

Yet another object of the present invention is to provide a cost-efficient technique for automated e-business interactions that does not require intensive programming for each particular application.

A further object of the present invention is to provide a technique for automated e-business interactions that is based on a standardized structured markup language.

Another object of the present invention is to provide this technique in a generic manner such that an application developer is required to write only a minimal amount (if any) of application-specific code.

Still another object of the present invention is to provide this technique with a structured markup language processing engine that is adapted to automating service definitions specified in service definition documents.

Another object of the present invention is to provide an improved technique for defining e-business process and data interactions.

A further object of the present invention is to provide an improved technique for developing e-business implementations.

Still another object of the present invention is to provide an improved technique for carrying out e-business.

Yet another object of the present invention is to provide a technique for automated implementation of finite state machine descriptions by using a structured markup language processing engine that is adapted to processing specifications from structured markup language documents.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in one aspect the present invention provides a computer program product, a system, and a method for automated e-business services. In a second aspect, the present invention provides a method, system, and computer program product for automated implementation of finite state machine descriptions for one application to navigate data and process interactions with other (heterogeneous) applications.

The technique of the first aspect comprises: reading a specification of an e-business service; and processing the specification to carry out the e-business service. The processing further comprises: receiving one or more input documents for the e-business service; and performing one or more of (1) transforming the input documents into other documents, according to transformation information that may be provided in the specification, and (2) operating upon the input documents and/or the other documents to create one or more new documents, according to operating actions that may be provided in the specification.

This technique may further comprise forwarding the other documents and/or the new documents to a different computing system. The specification and the input documents are preferably encoded in a structured markup language, which is preferably XML or an XML derivative. The other documents and the new documents are also preferably encoded in this structured markup language.

Operating upon the input documents and/or the other documents may further comprise invoking one or more software-implemented processes and coordinating results of the invocations. The technique may also further comprise repetitively executing the processing step, until reaching a final result of the e-business service, wherein the other documents, the new documents, and/or the coordinated results of the invocations now function as the input documents.

The technique of the second aspect comprises defining process and data interactions for an application described by a finite state machine, further comprising: defining data inputs to be used by the application; defining interactions to be carried out when operating the application; specifying details of the data inputs in a structured markup language syntax; specifying details of the interactions in the structured markup language syntax; and creating one or more application definition documents wherein the specified details of the data inputs and the specified details of the interactions are recorded. The structured markup language is preferably XML or an XML derivative.

This second aspect also comprises automating data and process interactions between a first application and one or more other applications. This technique comprises: providing one or more application definition documents encoded in a structured markup language, wherein the application definition documents specify the interactions and one or more data inputs to be used in the interactions, and wherein details of the specified interactions and data inputs are specified in the structured markup language; and processing the application definition documents to carry out the data and process interactions. Preferably, processing the application definition documents further comprises: receiving one or more input documents to be used by the interactions; and performing one or more of (1) transforming the input documents into other documents, according to transformation information that may be provided in the application definition documents, and (2) operating upon the input documents and/or the other documents to create one or more new documents, according to operating actions that may be provided in the application definition documents. The technique may further comprise forwarding the other documents and/or the new documents to from one or the computers to another of the computers. Preferably, the structured markup language is XML or a derivative thereof.

The present invention also provides a method of defining e-business process and data interactions, further comprising: defining data inputs to be used by an e-business service; defining interactions to be carried out when operating the e-business service; specifying details of the data inputs in a structured markup language syntax; specifying details of the interactions in the structured markup language syntax; and creating one or more e-business service definition documents wherein the specified details of the data inputs and the specified details of the interactions are recorded. In this method, structured markup language is preferably XML or a derivative thereof.

The present invention will now be described with reference to the following drawings, in which like reference numbers denote the same element throughout.

BRIEF DESCRIPTION OF THE DRAWINGS

FIG. 6 illustrates the format of a service definition script that is used to define an e-business service, according to the preferred embodiment of the present invention;

Appendix A.1 provides a document type definition ("DTD") that may be used for defining e-business services, according to the preferred embodiment of the present invention;

Appendices A.2 through A.4 provide example service definition scripts for a wholesale purchase order application that is described using the techniques of the preferred embodiment of the present invention, and which is used to illustrate operation of the present invention;

Appendix A.5 provides an example resource definition file for use with the wholesale purchase order application, according to the present invention; and Appendices A.6 through A.22 provide sample input and output documents that illustrate operation of the wholesale purchase order application, according to the present invention.

DESCRIPTION OF THE PREFERRED EMBODIMENT

Figure 1:
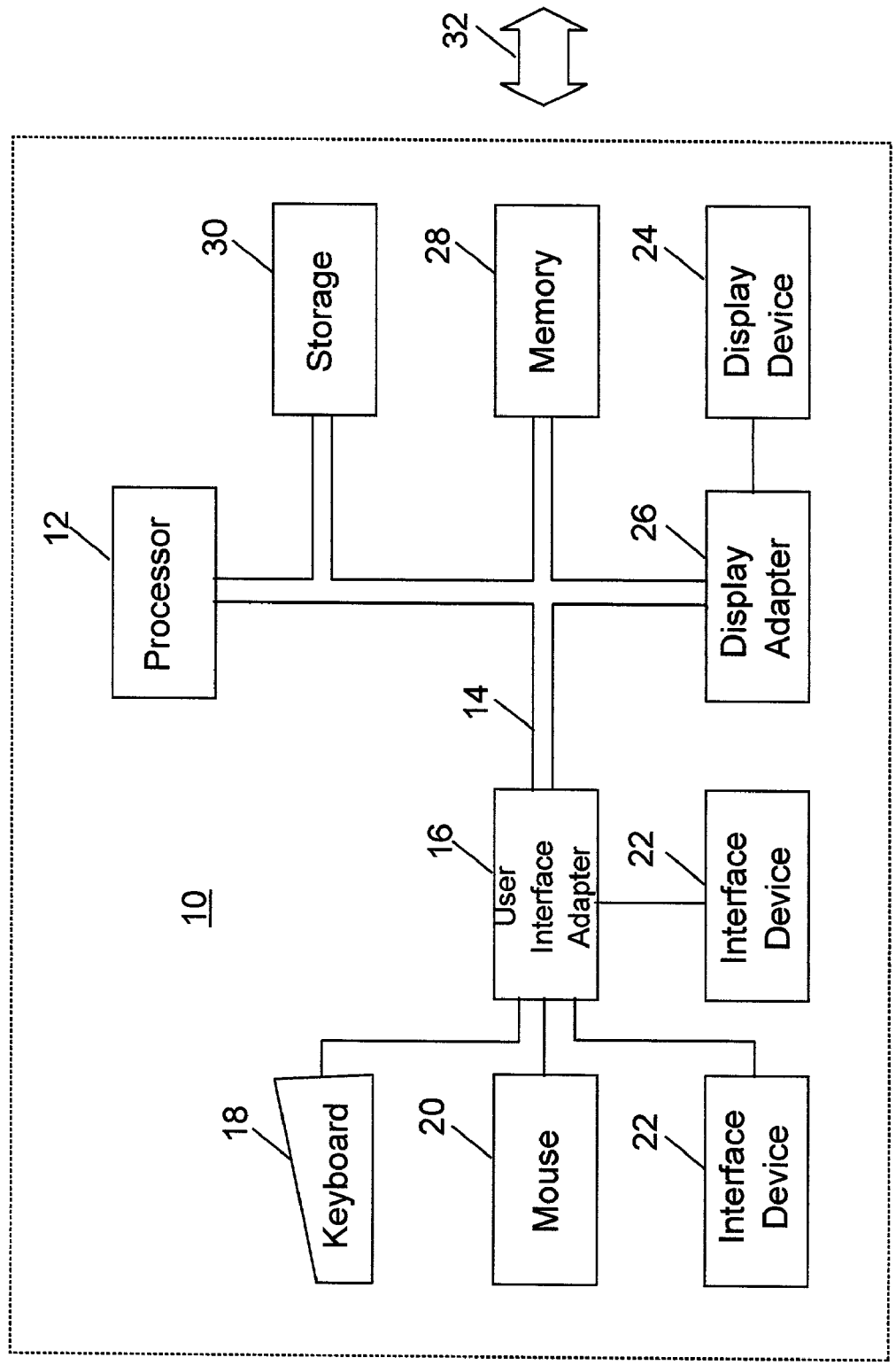
FIG. 1 is a block diagram of a computer hardware environment in which the present invention may be practiced.

FIG. 1 illustrates a representative hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network ("LAN") or a wide area network ("WAN"), or the workstation 10 can be a client in a client/server arrangement with another computer, etc. All of these configurations, as well as the appropriate communications hardware and software, are known in the art.

As an alternative to the workstation 10 depicted in FIG. 1, the present invention may operate on other computing devices such as servers or mainframe computers. The hardware environment of such other devices is well known in the art.

Figure 2:
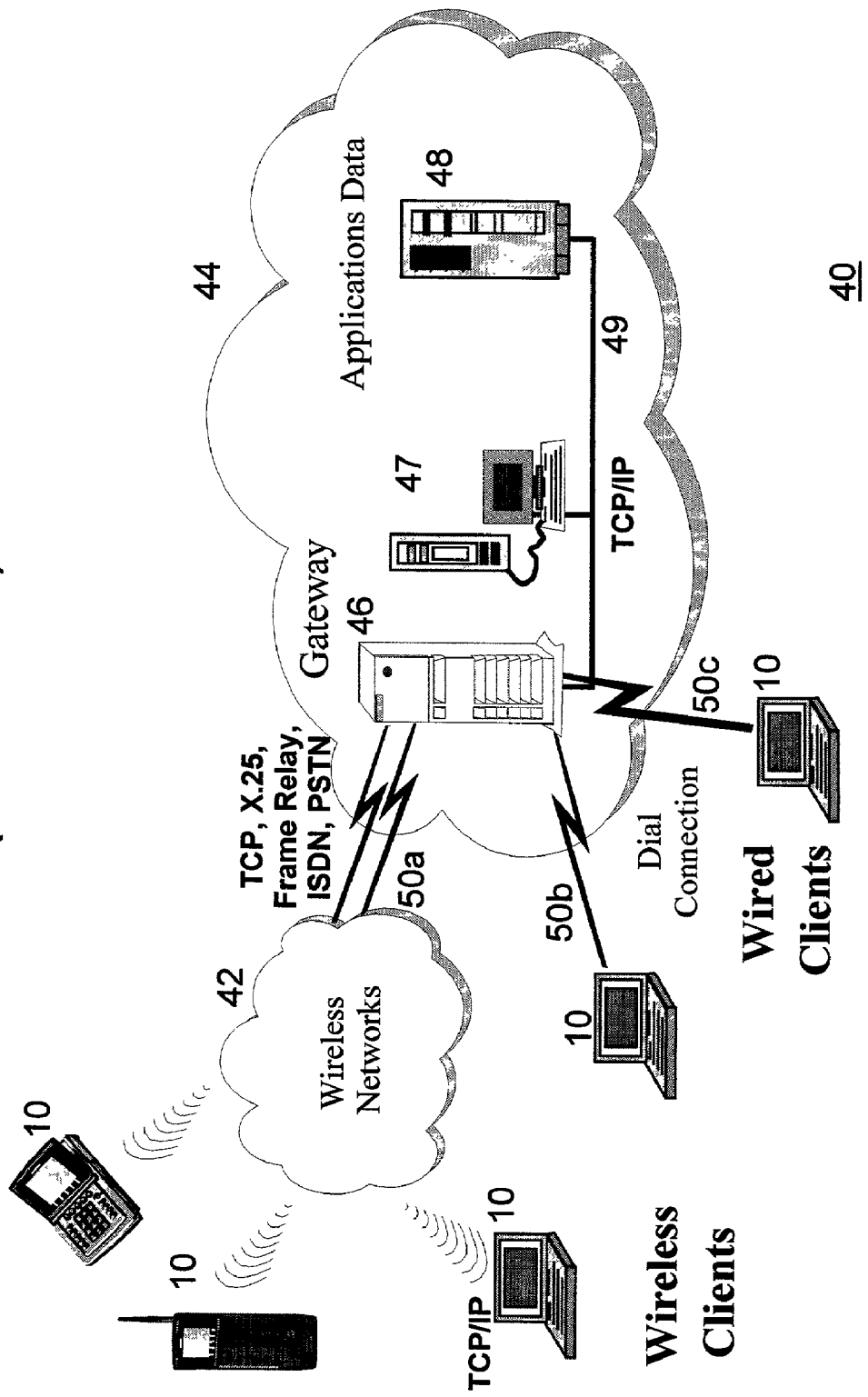
FIG. 2 is a diagram of a networked computing environment in which the present invention may be practiced.

FIG. 2 illustrates a data processing network 40 of the type in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 46 may also be coupled 49 to a storage device (such as data repository 48). Further, the gateway 46 may be directly or indirectly coupled to one or more workstations 10, and servers such as gateway 46 and application server 47 may be coupled to other servers (not shown in FIG. 2).

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 (for example, of the workstation 10, gateway 46, and/or server 47) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

Computing devices which make use of the present invention, when connected, may use a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The computing devices which make use of the present invention may be any type of computer processor, including laptop, handheld or mobile computers; vehicle-mounted devices; desktop computers; mainframe computers; etc., having processing capabilities (and, when e-business transactions are being electronically exchanged, communication capabilities as well). These techniques are well known in the art, and the hardware devices and software which enable their use are readily available. For ease of reference, the computing device from which a service request originates may be referred to herein as a "requester" or "client", although the requester may be a server machine operating as a client for a particular request/response scenario, and/or may alternatively be a device operating in a peer-to-peer or other network model. Similarly, the computing device from which a service response originates may be referred to herein as a "responder" or "server", for ease of reference.

In the preferred embodiment, the present invention is implemented in computer software. The software may operate as one or more modules (also referred to as code subroutines, or "objects" in object-oriented programming) on a client, server, or intermediary device in a network. Or, the software may execute on multiple devices in a distributed manner. An implementation of the present invention may be executing in a Web environment, where a Web server provides services in response to requests from a client connected through the Internet. Alternatively, an implementation of the present invention may be executing in a non-Web environment (using the Internet, a corporate intranet or extranet, or any other type of network). Configurations for the environment include a client/server network, as well as a peer-to-peer environment. These environments and configurations are well known in the art. References herein to client and server devices is not meant to limit the present invention to requests which originate with single-user client workstations. (For example, the present invention may be used advantageously for transactions between two machines which typically function as servers.)

In a first aspect, the present invention provides an applicant-independent technique for defining, developing, and carrying out automated e-business services. A structured markup language, which for discussion of the preferred embodiment is assumed to be XML, is used by application designers (or, equivalently, by other application domain experts) to define request and response services for a particular business application. (Note that references herein to XML are for purposes of illustration and not of limitation: other structured markup languages, including but not limited to XML derivatives, may be used alternatively, without deviating from the inventive concepts disclosed herein.) Preferably, the same structured markup language is also used to specify request and response documents for the business application (including input documents, output documents, and intermediate documents created during processing of the application and used by that processing). A structured markup language processing engine, referred to equivalently herein as an "XML data exchange engine", automatically carries out the business application by invoking services and sub-services and synchronizing the overall processing thereof in order to properly execute the business application. The disclosed techniques provide an XML data exchange service that provides simplicity, flexibility, and improved interoperability and performance over prior art e-business techniques, and which makes development and deployment of e-business applications faster and easier.

In a second aspect, the present invention provides an application-independent technique for defining, developing, and carrying out automated interactions in any type of application that may be described using finite state machines. In this aspect, the techniques described for the first aspect are applied analogously to structured markup documents created for purposes other than e-business, where the content of the structured markup documents represents the data to be used and the interactions to be carried out as an underlying application operates according to the transitions of a finite state machine model.

The preferred embodiment of these aspects of the present invention will now be discussed in more detail with reference to FIGS. 3 through 12 and Appendices A.1 through A.22. The discussion is directed to the first aspect: it will be obvious to one of skill in the art how the described principles and events correspond to the scenario of the second aspect.

The technique of the present invention provides for automated e-business services in which XML is used to define the data to be used in the underlying service, as well as to describe what type of service is to be performed on that data. In the preferred embodiment, the latter comprises specifying, in the XML documents: transformations to be performed; how to combine input documents from multiple sources; how to distribute output documents to multiple targets; customer objects (such as methods on object-oriented software objects) that are to be invoked; synchronous and asynchronous processing; timer events, including timeouts and scheduled waits; data pattern matching; transcoding processes that are to be invoked; looping; conditional branching; and so forth. A preferred embodiment of the set of processing features to be provided is illustrated by the DTD in Appendix A.1, which includes explanatory comments. A number of these features will be discussed herein to explain operation of the present invention, making reference to the sample XML documents in Appendices A.2 through A.22 which illustrate a wholesale purchase order service and the processing of a purchase order through this service. (Appendices A.1 through A.22 are hereby incorporated herein by reference.)

Figure 3:
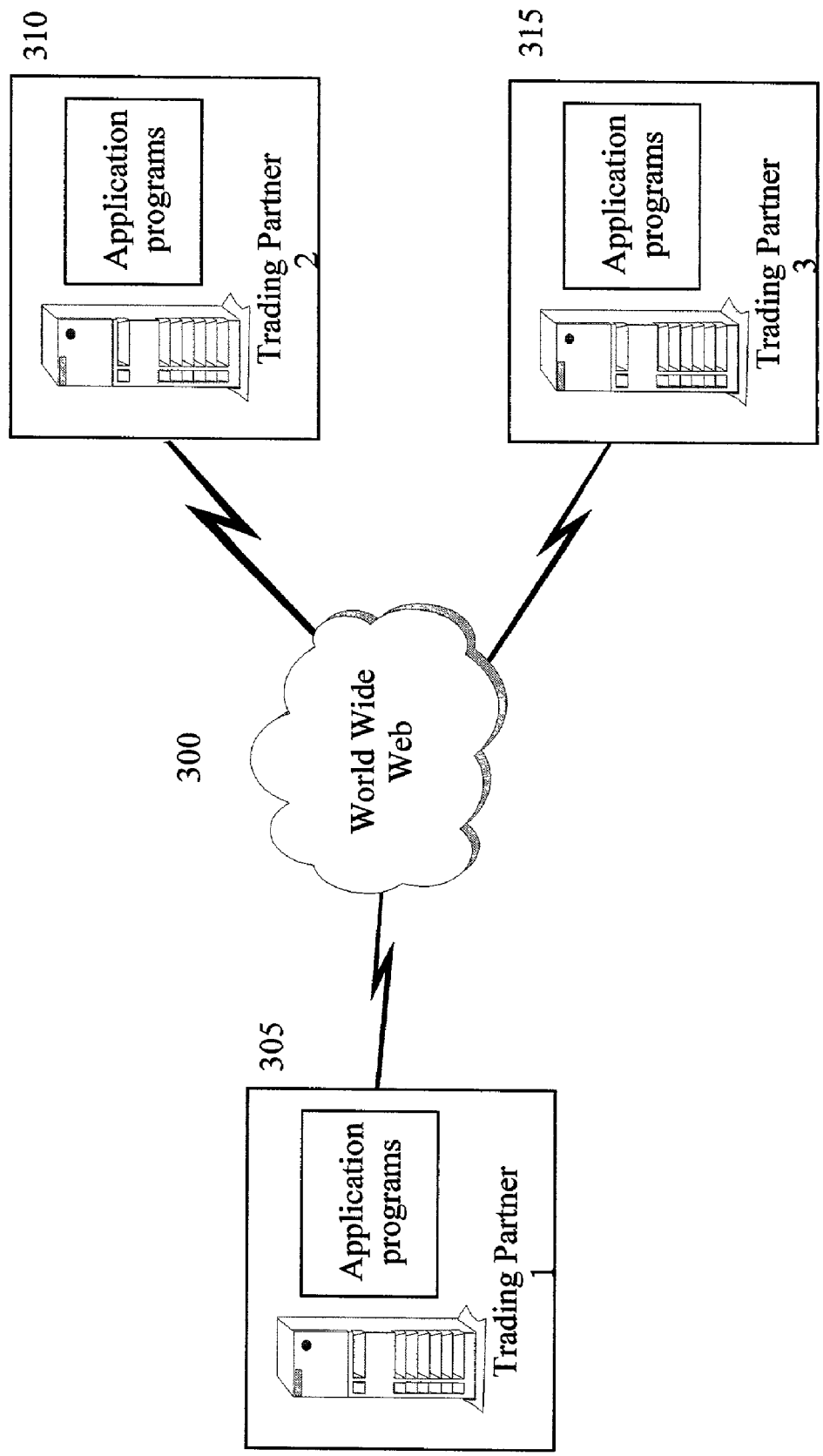
FIG. 3 depicts an example of a B2B transaction environment wherein trading partners participate in an electronic business transaction.

An overview of the environment in which trading partners participate in an electronic B2B transaction is illustrated in FIG. 3. In this example, a group of trading partners has agreed on how services and information should be exchanged for a particular e-business service. A network (300) of some type, which may be the Web, enables the trading partners to communicate electronically. Preferably, TPAs have been created to define the roles and parameters of the agreement. Each partner must then carry out its part of the agreement. For example, suppose trading partner 1 (305) places a retail order for items from trading partner 2 (310). Filling this order may require trading partner 2 to place a wholesale order with one or more other trading partners such as trading partner 3 (315). Each partner must initiate the required application-specific processing on its computing resources, and generate information to be sent over the communications network to the other business partner(s) to enable the overall transaction to be completed.

In order to enable the automatic data transformation and process integration by which the trading partners of FIG. 3 cooperatively process e-business transactions according to the present invention, each trading partner prepares a set of "XML automation scripts" for interactions with the other trading partners. These XML automation scripts are XML documents of the type illustrated in Appendices A.2 through A.4, which will be discussed below. Data definitions and external interactions (e.g. service invocations with other trading partners) must be mapped (i.e. transformed, if necessary) to an internal format usable by a particular trading partner, and processed by that partner according to the agreements of the TPA. (Note that it is not strictly necessary that a TPA document be used with the present invention. What is required is that the cooperating entities have some means of conveying this type of information, but many alternative approaches may be used such as having a systems administrator specify the requisite information in a configuration file. For ease of reference, the discussions of the preferred embodiment assume use of a TPA.)

Each XML automation script created by a trading partner will preferably specify the actions required to wait for any input data to be used in that partner's processing (for example, actions that enable determining when the appropriate input data has been received), and to act on data inputs iteratively until the processing thereof is complete. The actions to be taken could include XML transformations, handing off data to specific logic processes, or both. XML transformations that may be performed include use of high-performance transformations such as merging document content, changing entities to attributes or attributes to entities, deleting document content, and other transformations of the type defined in U.S. Pat. No. 6,941,511 (Ser. No. 09/653,080, filed Aug. 31, 2000), which is entitled "High-Performance Extensible Document Transformation" and is referred to hereinafter as "the related invention". Preferably, high-performance transformations of this type are performed for documents in a critical path for the performing of an e-business service. Other types of XML transformations that may be performed include application of conventional stylesheets and transformations performed using specially customized logic. The handing off of data to other logic processes serves to integrate foreign processing with the script, where this foreign processing may be other scripts, local software processes (such as application-specific code that has been installed in this trading partner's computing environment), external software processes located at a partner's site, or some combination thereof.

Figure 4:
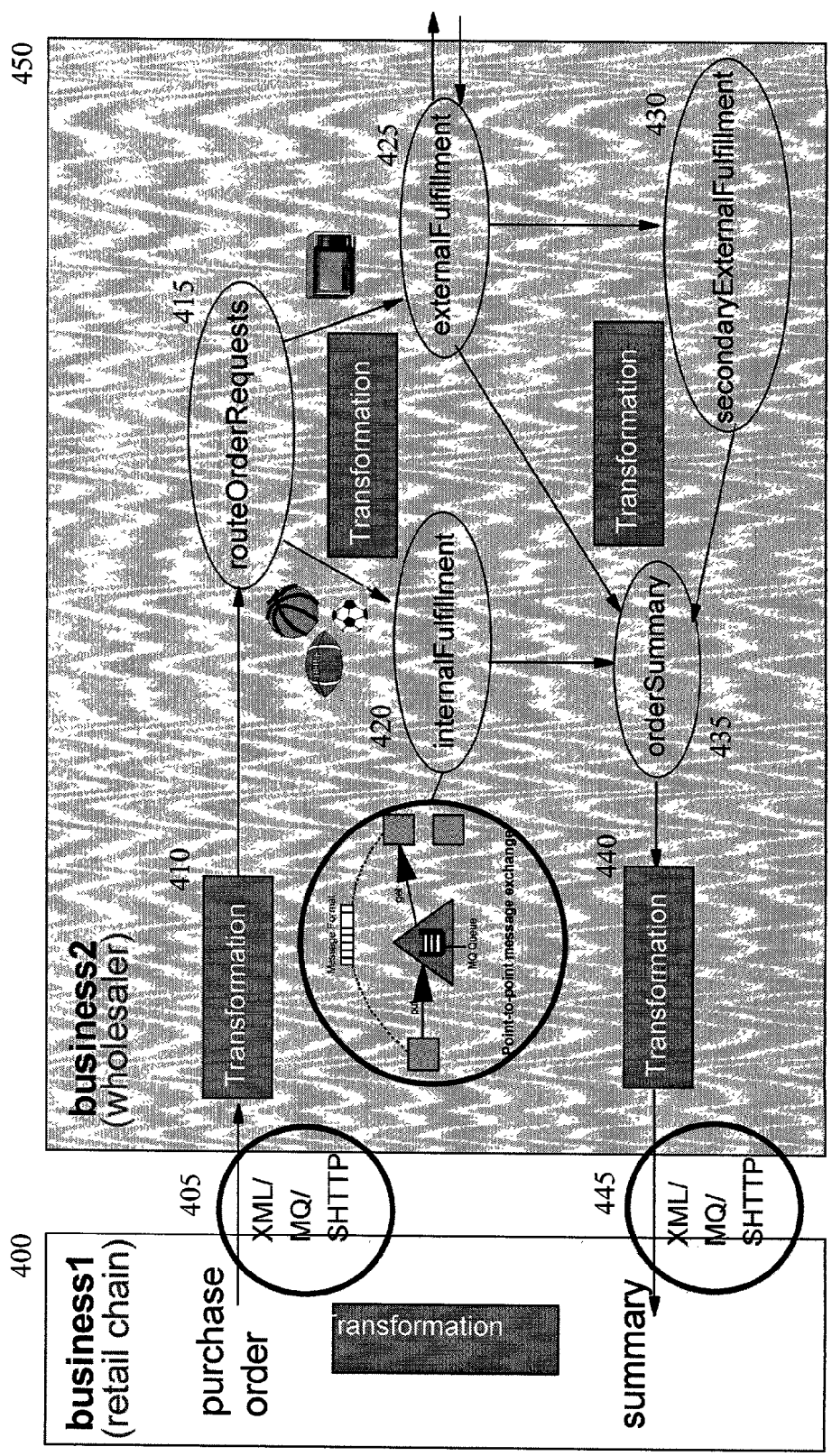
FIG. 4 illustrates a representative complex B2B transaction that is used to describe operation of the preferred embodiment of the present invention.

The e-business service transaction depicted in FIG. 4 describes a supply chain scenario that will be used to further illustrate the details of the XML data exchange service automation technique of the present invention. A retail chain company 400 (referred to as "business1" in FIG. 4) submits purchase orders to the wholesale company 450 ("business2") for fulfillment. For purposes of the example e-business transaction represented in Appendices A.2 through A.22, the retail company places an order for items including basketballs, footballs, soccer balls, and microwaves. As in a typical wholesale purchase installation, individual orders are collected during normal operation of business1 and submitted in a "batch mode" transaction to business2, perhaps at the close of a business day. The process of batching the individual purchase orders together into one larger order may be accomplished within the scope of the present invention using high performance XML transformations, such as the "merge" operation discussed above. Once the batched orders are ready for submission to business2, they will be forwarded as shown at 405 for carrying out the actual fulfillment process. Batching of orders might also (or alternatively) occur at business2, using similar techniques. In this example, as shown in the XML documents used in the Appendices, business2 also batches business1's orders together with orders received from other retail customers.

For purposes of illustration, suppose business2 takes the customer-submitted purchase orders and then splits them into two groups: those items which are available directly from business2 and which are currently in stock, and those items which business2 must order from some other vendor. These two groups will be referred to hereinafter as the internal and external purchase orders. This transformation of the incoming orders is shown in FIG. 4 at 410. (The logic to perform this split is specified in Appendix A.5 as an in-line high-performance transformation called "splitOrders", and may be implemented using the techniques of the related invention.) Business2 must then route the split orders for internal and external fulfillment processing (as shown at 415), collect the results into an order summary (435), and return the order summary (445) to the customer. It may be necessary to transform the order summary (440) before sending it to the customer. In this example scenario, if external fulfillment (425) cannot be fully satisfied by a primary supplier, business2 requests fulfillment by a secondary supplier (430).

The information exchanged between the trading partners (i.e. business1 and business2, as well as preferably the external suppliers not shown in FIG. 4) and between the local processes within each business, is formatted as XML documents, with proper transformations being performed on the document content between various sub-services. As stated previously, high-performance transformations of the type disclosed in the related invention are preferably used where response time is critical. For example, a high-performance inline transformation may be performed in the hand-off to the local internalFulfillment (420) process. When response time is not critical, other transformation techniques such as conventional stylesheet processing should be adequate (for example, when preparing a vendor purchase order to send to an external supplier, where it can be assumed that the order will not be fulfilled immediately and a response might not be received for several hours, days, or even weeks).

As indicated at elements 405 and 445, the information exchanged between business partners is preferably XML documents that are transmitted with a reliable messaging protocol on top of a secure transfer protocol such as SHTTP ("Secure HyperText Transfer Protocol"). One example of a reliable messaging protocol that may be used is that provided by the MQSeries® product from IBM, which is denoted in FIG. 4 as "MQ". ("MQSeries" is a registered trademark of IBM.) However, other protocols may be used alternatively. The local processing at each business partner's site will typically comprise database operations (e.g. to determine whether a requested item is currently in stock, in the purchase order example), and may also involve use of MQ for routing messages between processes reliably as well as use of transaction applications where such processing may be wrapped in an XML interface. The details of this type of local processing do not form part of the present invention: the present invention defines a technique for invoking execution of such database, queuing, and transaction system processes, and synchronizing the interactions among such processes within an overall transaction.

Figure 5:
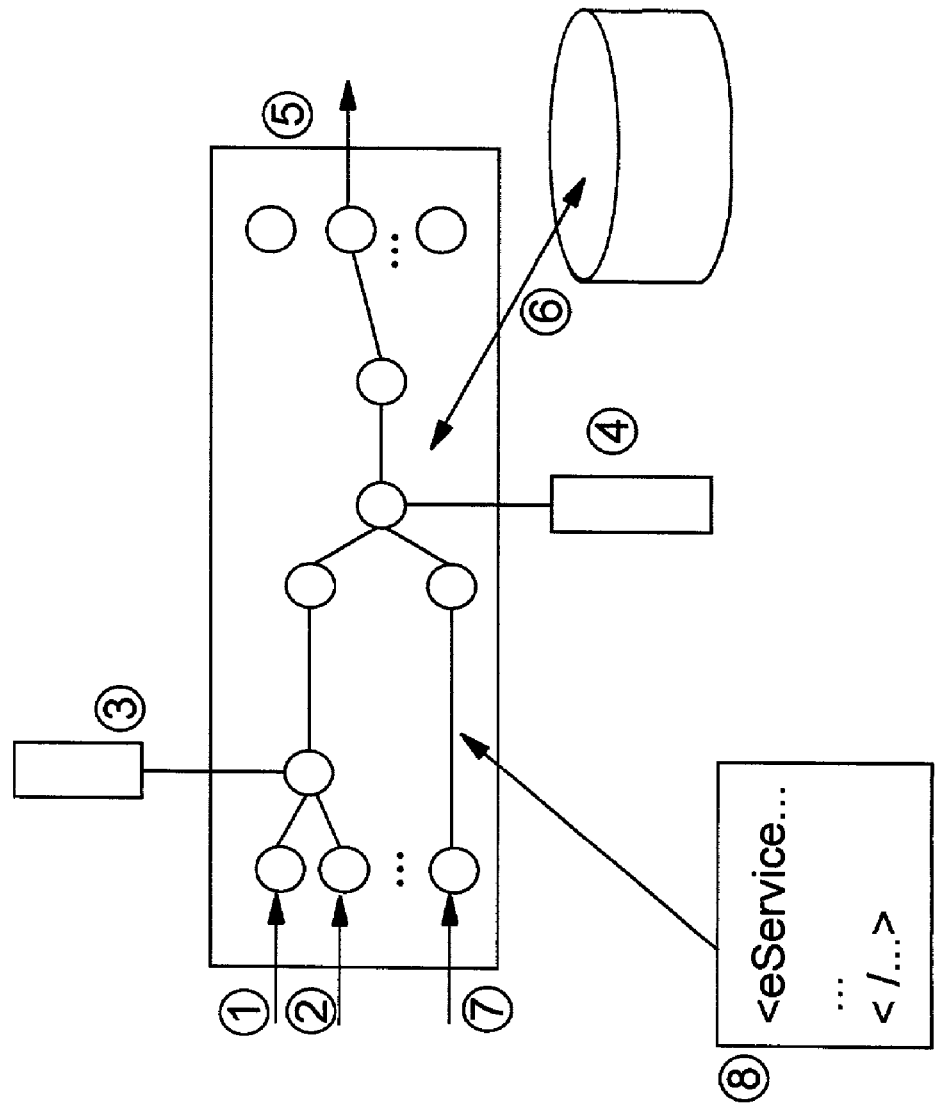
FIG. 5 illustrates the flows involved in the illustrative B2B transaction of FIG. 4, showing how the data and processing must be coordinated.

FIG. 5 illustrates the flows involved in the illustrative B2B transaction of FIG. 4, showing how the data and processing must be automatically integrated and coordinated even though input data may arrive from multiple sources (and processing may need to be delayed until receiving particular input data) and output data may be sent to multiple targets. As the flows of FIG. 5 occur, the data exchange engine of the present invention transforms a data-driven business process from one state to another state. The XML documents used in the various states represent data content as well as state exchanges in this process. For example, input XML documents such as the customer purchase orders shown in Appendices A.6 and A.7 contain the initial input data for processing customer orders (i.e. representing an order from customer "storeUSA" and one from customer "USA-mart", respectively) and they also represent the initial state of the state-based transition that occurs as the orders are processed by business2. The purchase order response documents shown in Appendices A.21 and A.22 contain the output data for the purchase order processing, and also represent the ending state of the transitions in business2's processing. The documents in Appendices A.8 through A.20 contain intermediate results of the processing at business2, and represent intermediate states along the way. (The processing that may occur at the customers, and at the external suppliers, is not shown in the Appendices. It will be obvious to one of ordinary skill in the art, by review of the examples and teachings provided herein, how XML documents representing the processing at the other business partners may be created.)

In the general case, a business participates in a given B2B application with several partners. The data exchange engine of the present invention must collaborate the incoming XML documents from these partners, invoke the required processing (which may be application-specific business logic or merely XML-to-XML transformations of the type discussed previously), and dynamically respond with outgoing XML documents according to the needs of the business application. The data exchange engine enables this to occur in a generic, application-independent manner. In the example flows illustrated in FIG. 5, a business initially receives two input XML documents (denoted as the encircled numerals 1 & 2) from its partners. (These input documents may correspond, for example, to the customer purchase orders shown in Appendices A.6 and A.7.) These documents are then combined and transformed into a single internal XML document by invoking a proper process (3). (See, for example, Appendix A.8, where the customer purchase orders have been combined and further transformed.) The internal XML document may need to wait for the arrival of additional XML documents (such as an order from another customer) which are then processed further (4). Eventually, an XML output document is created and sent to the appropriate business partners (5). The data exchange engine resides locally (6) at the business partner performing the particular business service, and controls the processing flows and operation of the business service in a generic manner. For example, the process of extracting a few tags and tag values from an input XML document to form a new XML document can be performed as a simple Extensible Stylesheet Language Transformation ("XSLT") operation without the need of any special coding. According to the present invention, this transformation operation may be described as an action for the data exchange engine to apply to an input XML document (7) if certain conditions are met, as defined in a service script XML document (8). Therefore, the data exchange engine has simplified the implementation of a B2B application by tying all key pieces together: data, processing logic, partner agreements, input/output routing, and business collaboration. Developers will be able to provide their solutions much more quickly and efficiently than in the prior art by focusing on XML formats and transformations, business process interactions, and service automation scripts (with only a small amount of supplemental coding, if any).

FIG. 6 illustrates at a high level the format of a service definition script that is used to define an e-business service, according to the preferred embodiment of the present invention. (Appendix A.1 contains a DTD which defines the format of the service definition script in detail, and Appendices A.2 through A.4 contain service definition scripts that have been constructed according to this DTD for use with the purchase order example.) Service definition scripts describe the business logic which connects software components to carry out an e-business service and its associated sub-services. By using this macro-level approach to software component description, it becomes very easy to introduce transformations upon XML documents into the processing flow and very convenient to manage the overall flow. More importantly, it provides the mechanism to separate the data and process interactions and integration logic from the underlying implementation of the infrastructure middleware. Business initiated changes in document formats and exchange protocols can be modified easily when using the present invention, without the need to regenerate large amounts of code that are tightly coupled with a particular infrastructure or framework as in the prior art.

As illustrated in FIG. 6, the basic element of the XML service script definition is a "ServiceUnit". Each ServiceUnit element has an attribute specifying its name, and also has child elements that specify a description, actions to be taken, and (optionally) a list of possible next services to be invoked when the current service is complete. In the example of FIG. 6, multiple ServiceUnit elements are shown. The description element of each ServiceUnit describes the conditions under which this ServiceUnit should be invoked. The actions element describes the data transformations and business logic processing to be performed. In the preferred embodiment, the allowable actions in the actions element are "transform" (for performing one or more data transformations) and "send" (to send an XML document to an identified element for processing, such as to a software method that will execute business logic to operate on the document contents). While these transform and send actions are defined for use with the preferred embodiment, additional or different actions may be provided in an implementation without deviating from the scope of the present invention. The nextServices element describes the next set of service unit that may be branched to as a result of preforming the actions of this ServiceUnit. Execution of a service definition script will start from the first ServiceUnit and be branched around based on matching the current XML data with the conditions described in the other ServiceUnits, until reaching the end. (Refer to the eServiceDefinition DTD in Appendix A.1 and the example service script documents in Appendices A.2 through A.4 for details and examples of using the eServiceDefinition and ServiceUnit elements.)

When processing the actions element of a service unit, the XML data exchange engine of the present invention may use several types of XML transformations. In the preferred embodiment, three general types of transformations are supported. These transformations are referred to herein as "inline", "stylesheet", and "custom". Inline means the transformation is performed via a call to one of the high-performance XML transformation callable services of the type defined in the related invention. Stylesheet means the transformation is via an application of an XSLT stylesheet (or other similar stylesheet). Custom means the transformation is performed via customized code. A transformation can further invoke customized extensions to alter attribute values and element contexts of the transformed content. (In alternative embodiments, more or fewer transformations may be supported, and different types of transformations may be supported.) For examples of how transformations are specified, see Appendix A.5 which includes the syntax for processing inline transformations (such as "splitOrders") and for invoking stylesheet and custom transformations.

When processing a send element within an actions element, the XML data exchange engine sends the document (which may have been transformed first) to one or more foreign processes (i.e. processes which are outside of the control of the service definition script), where such processes could reside on the local or an external partner's computing system. (Or, the send might specify a destination which is another eServiceDefinition script by using an "eService" keyword to identify the target process, as illustrated in the "processOrders" ServiceUnit in Appendix A.2, which specifies an invocation of the "WholesaleOrder" eService.) In the preferred embodiment, the send element causes the document to be handed off, and then control returns immediately to the service definition script processing. The foreign processes are expected to respond later to the script, directly or through an alternate transparent interface mechanism attached to the engine, by providing the XML document(s) that one or more nextServices elements are waiting for. Thus, by default, the send element is asynchronous. Synchronous processing may be provided by having the XML data exchange engine wait for the response to arrive before returning to the script processing. Service definition scripts support both long running "staged" processes (that is, those where processing must be properly ordered from one sub-service to another, and which may require an extended period of time such as days or even weeks to complete) and shorter duration, interactive processes. Documents sent to external partners are preferably handled by eServiceDefinition scripts at the other partner's end.

The service definition script used by the present invention can be built using a text editor or a graphic editor, which may optionally be specifically adapted to creating service definition scripts. At run-time, the XML data exchange engine of the present invention reads the definition of the service, parses the XML document, and invokes the services correspondingly.

Referring now to the Appendices, Appendix A.2 describes the initial part of the wholesale purchase order processing. This service definition script receives individual customer orders and consolidates them into a common list to hand off to the main wholesale order processing at scheduled intervals. In the example, the interval is set to be long enough such that there will always be customer orders to process. This process can run on a different system than the main wholesale processing, if desired, handling order requests at sites that are close to the retail stores while passing the requests to the main wholesale site for processing.

By review of the service definition script in Appendix A.2 and its embedded commentary (along with Appendix A.5 and the syntax definitions and explanatory material in Appendix A.1), it can be seen that the processing begins with the "startCustomerService" service unit, which first finds all data (which may comprise subtrees of elements) in the input documents where "customerPurchaseOrders" appears at the root level. This data is then concatenated (added) to form a new document "customerPOs_worklist", which adheres to a "cPOs" DTD. This document is sent for local processing by "customerService_init", which causes invocation of an "init" method on an object "com.myCompany.customerService.class" of the local computing system. Processing then transfers to the "receiveOrder" service unit.

In the receiveOrder service unit, processing begins by obtaining documents having a DTD of "cPO". Data will be copied from the second-level "PORequest" elements to form a new document, "customerPO_summary", using "customerPOwork" as a template and the cPO DTD for this output document. This is followed by invoking a command string "assign(ordernumber,date)", and waiting for a result thereof This result is sent for local processing by "customerService_notify". Multiple next service units "notifyCustomer" and "waitNextOrder" are then invoked.

The notifycustomer service unit begins by obtaining a document and sending that document for local processing by "customerService_notify", after which its processing is complete. The waitNextOrder service unit gets an input document and adds the data from the element "customerPurchaseOrder" to the "customerPOs_worklist" as a last child element, according to the cPOs DTD. This document is then stored in persistent storage. A local process "customerService_wait" is then invoked, which may (for example) check the time to see whether it is time to send the work list for further processing. Control may then branch back to the previously-described receiveOrders service unit to process additional orders, and/or to the "processOrders" service unit as determined by the outcome of the "customerService_wait" process.

The processOrders service unit specifies to search for a match on a "postPOs" element, and to process documents containing this element by sending "customerPOs_worklist" for processing by "WholesaleOrder", an e-service process. According to the resource definitions in Appendix A.5, this corresponds to the service definition named "eServiceDefinitionWholesaleOrder". (This definition is provided herein in Appendix A.3.) Processing is then routed to the next service unit "resetWorkList".

The resetWorkList service unit matches against all documents, and begins by deleting all second-level "customerPurchaseOrder" elements (i.e. subtrees) from documents in source nodes having a "customerPOs_worklist" element. A new "customerPOs_worklist" element is then created, according to the DTD cPOs. The resulting document is sent for local processing by "customerService_wait", after which the receiveOrder service unit receives control.

The service definition in Appendix A.3 describes the middle part of the wholesale processing. It takes in the consolidated common list of customer purchase orders, separates internal and external fulfillment requirements, processes them separately, obtains their responses, and then puts the list back to pass it to the shipping and handling process after the orders have become ready. This processing will not be discussed in detail: reference may be made to the explanatory comments provided within the Appendix.

The service definition in Appendix A.4 describes the final part of the wholesale processing. It receives the list of consolidated customer orders that are ready for shipment from the main wholesale order processing. The list is handed off to a local process that interfaces with a warehouse system using information from the list. This process may perhaps run on a different system than the main wholesale processing, handling order delivery requests at a site that is close to the warehouse inventory system. The details of this processing will not be discussed in detail: for more information, refer to the explanatory comments provided within the Appendix.

The resource definition script in Appendix A.5 describes information about the resources used in the service definition scripts of the purchase order service, such as DTDs and XML documents to be used, transformations to be performed or invoked, destinations where foreign processes are located, etc. (The main purpose for using a separate resource definition is to separate the details pertaining to configuration of resources from the service definition scripts such that the resources information can be modified dynamically without affecting the scripting logic.) High performance transformation maps contained in the resource definition script define the information need to perform short (i.e. fast) transformations. The destinations define the interfaces for hooking up with individual processes, which can be further simplified to a common XML invocation interface.

Figure 7:
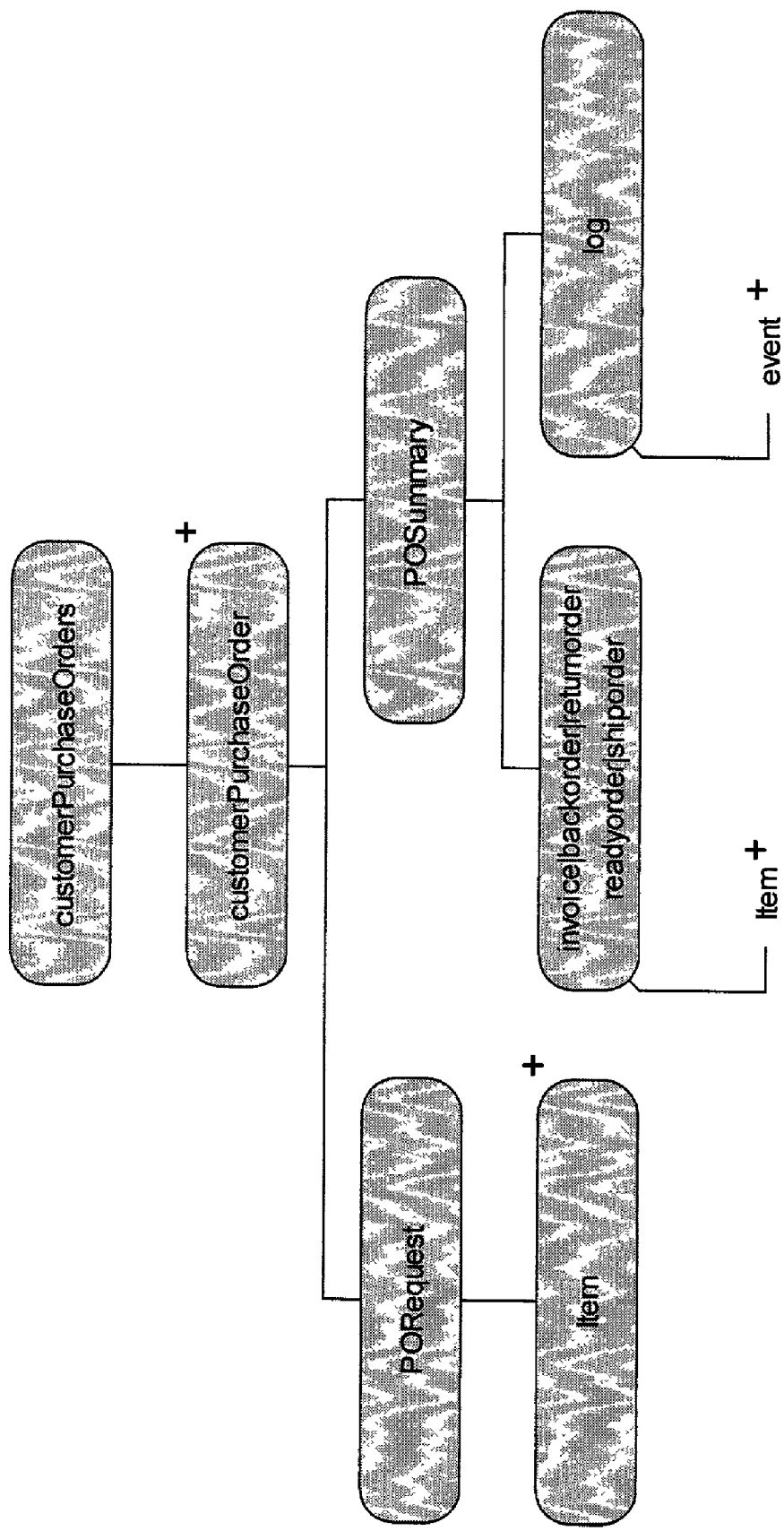
FIG. 7 illustrates the relationship and structure of the documents used in carrying out the illustrative B2B transaction of FIG. 4.

Appendices A.6 through A.22 illustrate the XML documents exchanged in the wholesale processing. The structure of the documents in this example is illustrated by FIG. 7. The master document, customerPurchaseOrders (e.g. as document such as that shown in Appendix A.8), provides the structure for the smaller documents (e.g. a document such as that shown in Appendix A.9) to be extracted easily as blocks.

Because the data is well structured, most transformations can be optimally done through predefined operations such as copy or merge.

As shown in FIG. 7, each customerPurchaseOrders document may comprise multiple customerPurchaseOrder documents (as shown by the "+" notation). Each of these customerPurchaseOrder documents comprises a PORequest element and a POSummary element. Each PORequest element may contain multiple Item element. Each POSummary element may contain a number of elements such as invoice, backorder, returnorder, readyorder, and shiporder, each of which may contain multiple Item elements. Each POSummary element may also contain a log element, which may contain multiple event elements. Refer to Appendices A.20 through A.22 for examples of these documents and elements.

FIGS. 8 through 11 provide flowcharts which set forth the logic which may be used to implement the preferred embodiment of the present invention.

Figure 8:
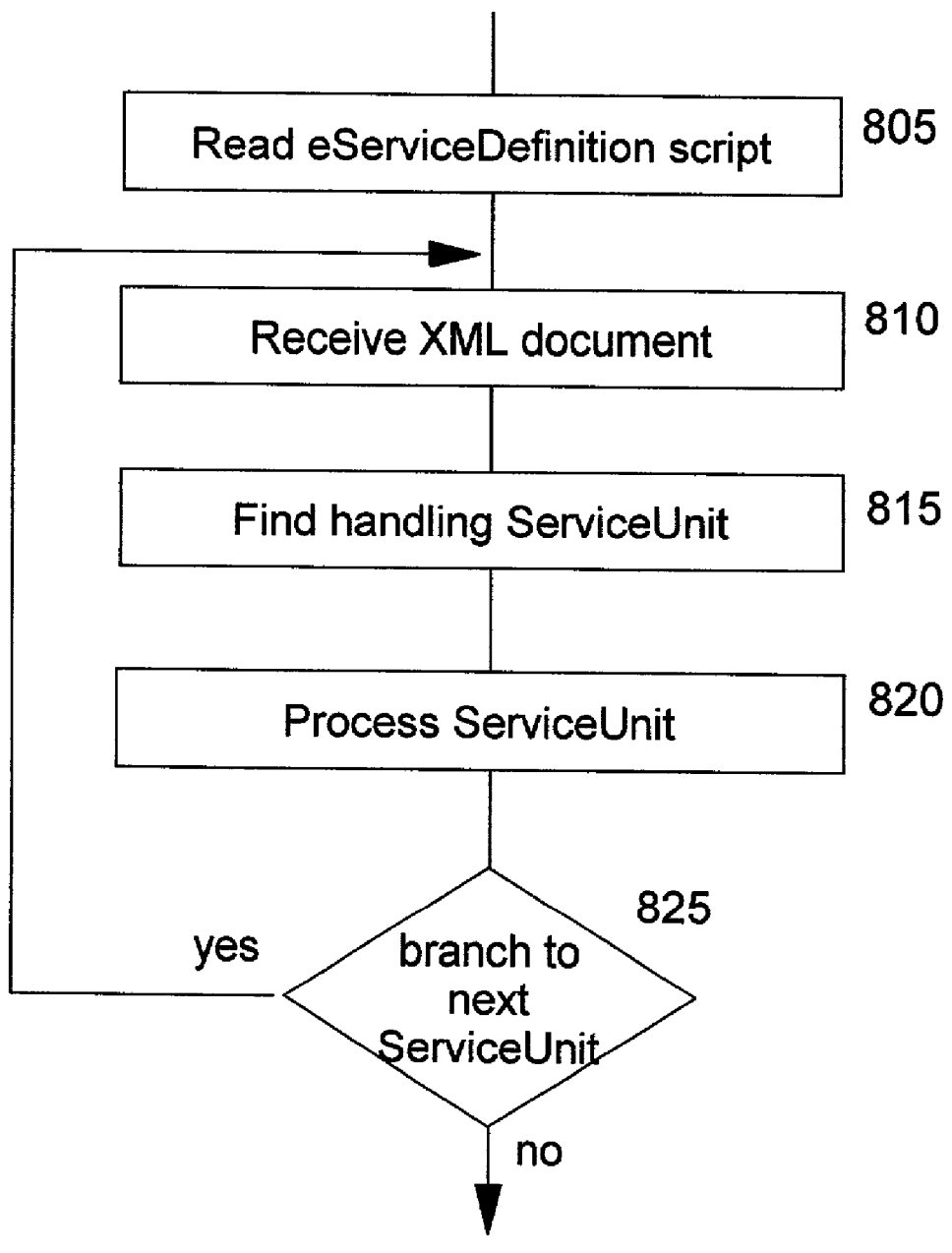
FIGS. 8 through 11 provide flowcharts which set forth the logic which may be used to implement the preferred embodiment of the present invention.

The processing of a service definition script begins with the logic shown in FIG. 8, which reads an eServiceDefinition script (Block 805). An input XML document is then read (Block 810), and a ServiceUnit matching this document is then located (Block 815) by matching the requirements specified in the ServiceUnit description elements of the eServiceDefinition script. The located ServiceUnit is then invoked (Block 820) to process the input XML document. This processing is depicted in more detail in FIG. 9. A test is then made (Block 825) to determine whether there is to be a branch to another (i.e. next) ServiceUnit. If so, then control returns to Block 810; otherwise, the processing of this service definition script is complete, and the logic of FIG. 8 ends.

Figure 9:
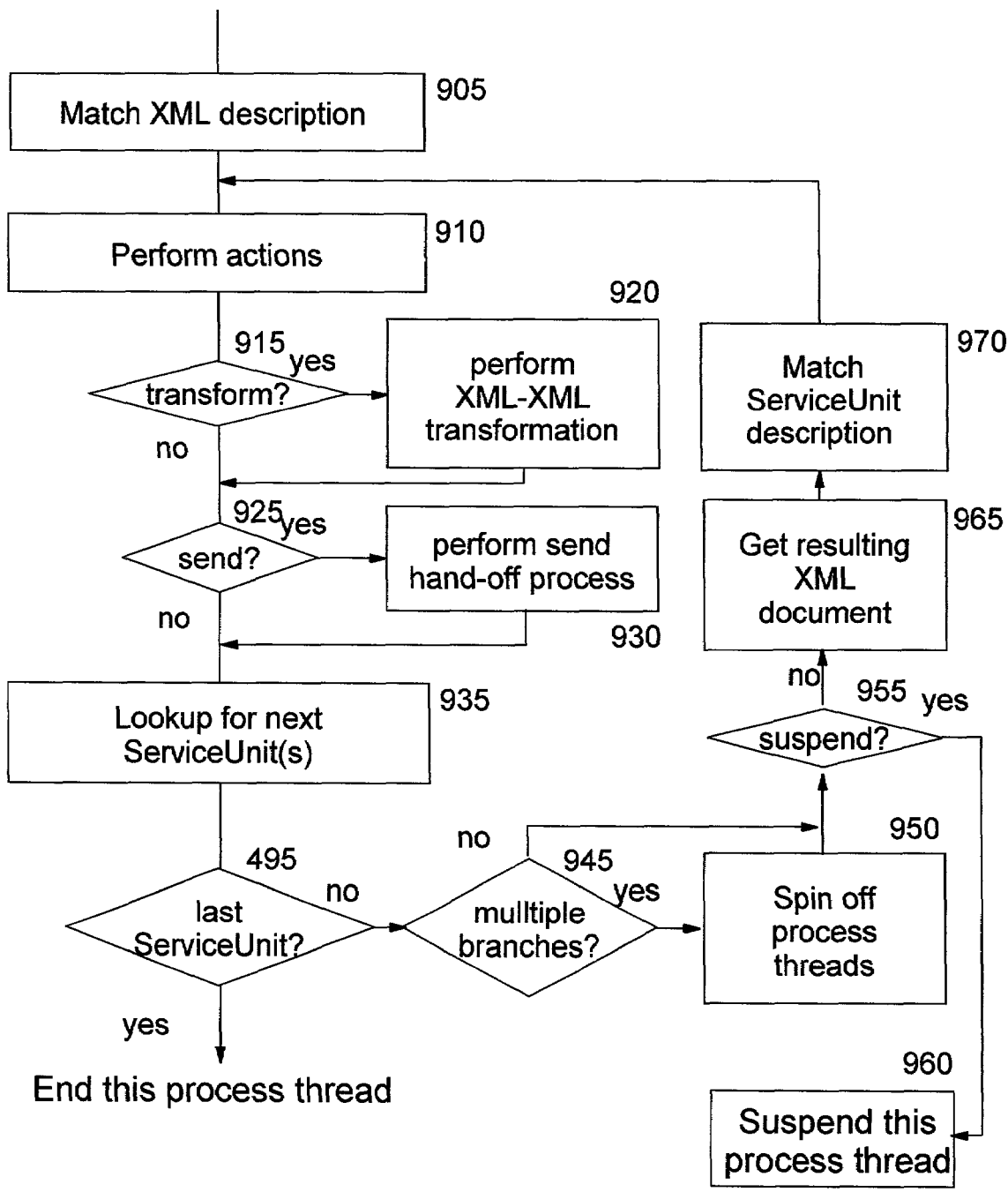

FIG. 9 illustrates the logic with which a ServiceUnit processing occurs. The requirements specified in the XML description element are matched (Block 905). (See, for example, the requirements specified in the "routeOrderRequests" service unit in Appendix A.3, which indicate how to find the items of interest in an incoming purchase order document by searching for particular tag or element values.) The actions specified in the ServiceUnit are then processed (Block 910). Block 915 tests to see if there is a transform action to process. If so, then Block 920 performs the indicated transformation (which in the preferred embodiment may be an inline high-speed transformation, stylesheet transformation, or a transformation that uses customized logic, as has been discussed above). Following the transformation, or when there is no transformation to be performed, Block 925 tests to see if there is a send action to process. If there is, then block 930 performs the required hand-off for the send (which in the preferred embodiment may be invocation of a local or external process, or of an eService process, as discussed above). The send processing is described in more detail in FIG. 10.

Following operation of Block 930, or when there is no send action to process, Block 935 performs a lookup for any next service unit(s) to be performed according to the nextServices element of the current ServiceUnit. If this is the last ServiceUnit (i.e. the nextServices element is empty), then execution of this processing thread ends and control returns to Block 825 of FIG. 8 (such that the processing of FIG. 8 ends only when all threads have ended). Otherwise, control transfers to Block 945, which tests to see if there are multiple branches to be processed (i.e. a branch="multiple" attribute is specified on the nextServices element). If there are multiple branches, then a new thread is spun off (Block 950) to process the additional service unit(s). (See the "routeOrderRequests" service unit in Appendix A.3 for an example of multiple branches.) Control then reaches Block 955, which checks to see if a suspend is indicated for the processing of the current service unit. In the preferred embodiment, a suspension is required when the serviceUnit definition indicates a time in days as the value for the suspend attribute. When the test in Block 955 has a positive result, Block 960 causes a suspension, which will be ended when the response XML document arrives. If the suspend value of time in days has expired before any document is received, then in the preferred embodiment an error or warning condition will be raised to the error exit. When there is no suspension required, the XML document resulting from the transform and/or send actions is obtained (Block 965), and a ServiceUnit definition that indicates how to process this document is located (Block 970) by matching the requirements specified in its description element. Control then returns to Block 910 to process this service unit.

Figure 10:
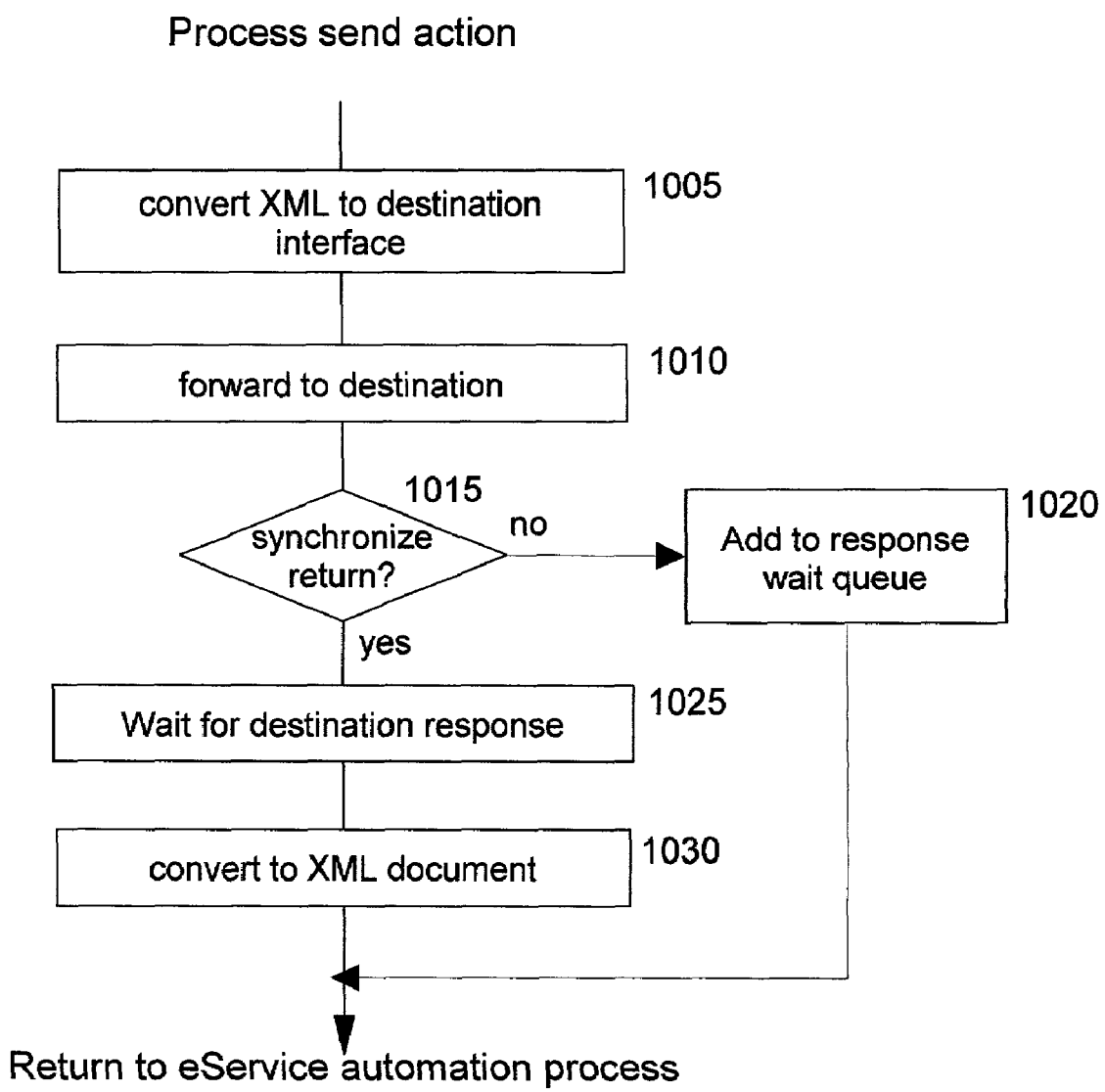

FIG. 10 provides more details of the processing of the send action of Block 920 in FIG. 9. The XML document is converted (if necessary) to the proper format for the destination interface (Block 1005). (See Appendix A.5: the send processing may invoke a method on the local computing system, or perhaps a process on a business partner's computing system that is reached through a Web address.) The document is then sent to the destination (Block 1010). Block 1015 tests whether the return from the destination is to be synchronized. By default, send processing is asynchronous, as stated previously. In this case, control transfers to Block 1020 where an indication is placed on a response wait queue. (Processing of the response is described in FIG. 11.) The processing of FIG. 10 is then complete, and control returns to the invoking logic of FIG. 9. Otherwise, when the send is to be synchronous, Block 1025 enforces a wait operation until the destination sends it response. This response is then converted (if necessary) to the format required on the local system (Block 1030), after which control returns to FIG. 9.

Figure 11:
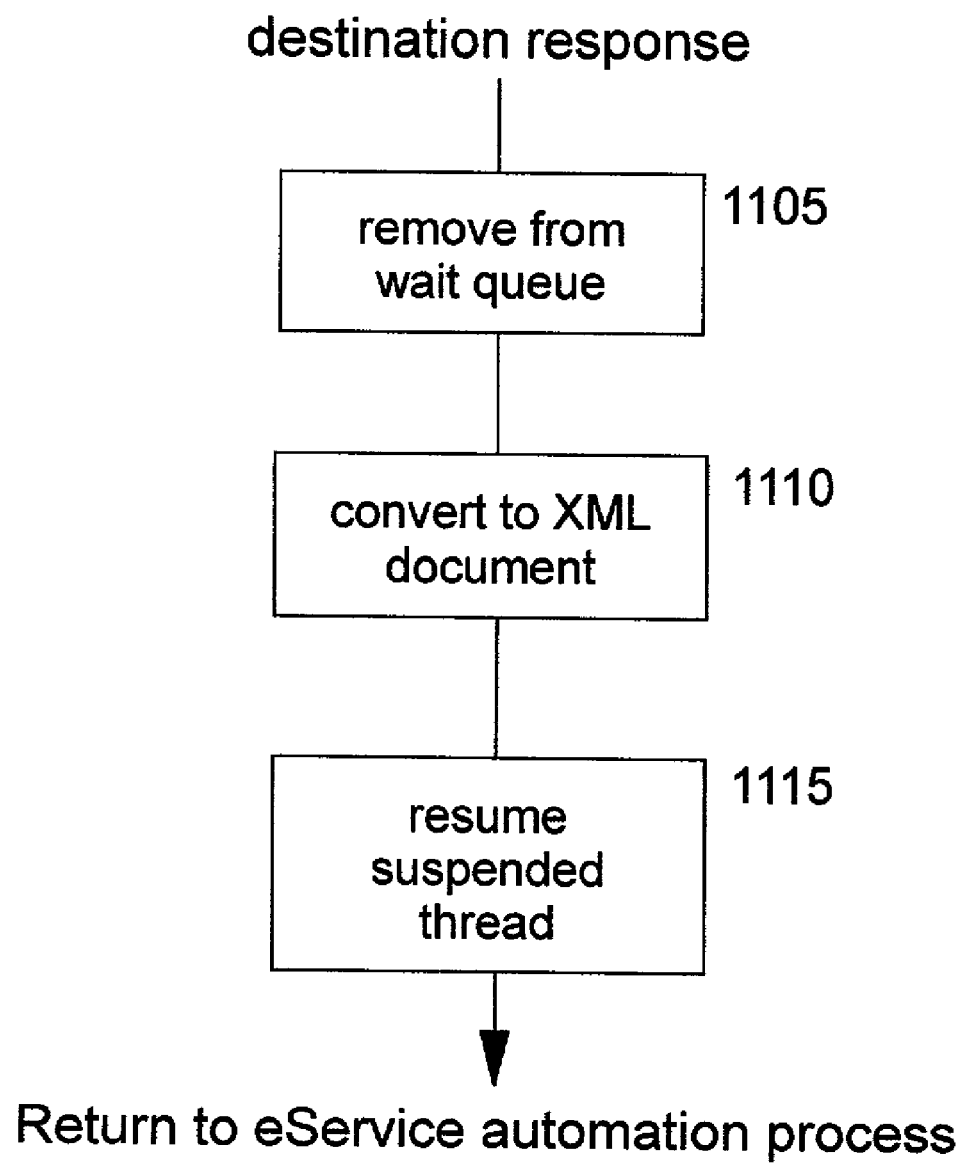

The logic in FIG. 11 describes how an asynchronous response from the destination of a send action is processed, upon receipt of the response from that destination. The corresponding indication (which was placed there by Block 1020 of FIG. 10) is removed from the wait queue (Block 1105). The received response is then converted (if necessary) to the format required on the local system (Block 1110), and the suspended thread is resumed (Block 1115). Control then returns to FIG. 9.

Figure 12:
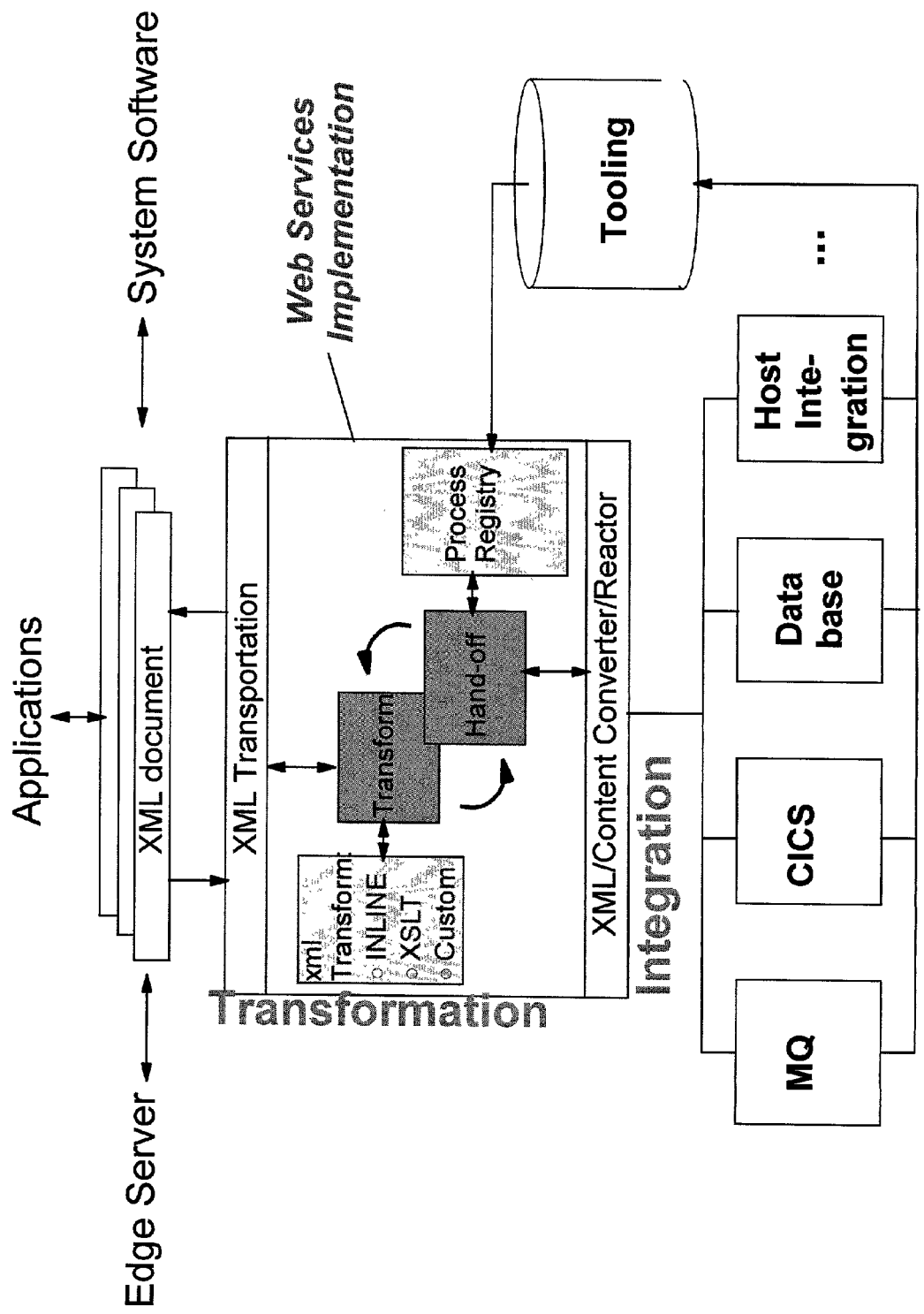
FIG. 12 illustrates an application architecture that is based on the preferred embodiment of the present invention.

FIG. 12 illustrates the application processing architecture that provides the separation of data and process interaction and integration business logic from system and middleware specific implementation infrastructures. The application uses scripting logic to control the data and process interaction and integration flows. The scripting logic can be constructed elsewhere by a domain expert and reused for the same exchange partnership role on different systems without being tied to a particular infrastructure or framework. Different engines can be used to run this script, which describes a finite state machine that automatically recognizes an XML document, transforms it to its next form, hands it over to a foreign process, and waits for the response document to come in for the next state. The application interacts with partner entities using a common data format such as XML. The application itself may be part of a system software, an edge server, or purely a piece of business logic.

Applications and data of different formats, such as MQ and CICS (IBM's Customer Information Control System product), can be integrated through an alternative transparent interface mechanism attached to the hand-off process of the scripting engine. The sample resource definition file in Appendix A.5 includes a list of destination definitions. Input and output XML documents and invocation methods are specified for the scripting engine to perform the hand-off processing. Applications and data that provide different formats can be matched to the common format using a registration process. For example, in the internal order fulfillment process example used herein, the internalPurchaseOrders document can be mapped to an MQ message input queue to be processed by an MQ application with the response returned in an MQ message output queue. Rather than providing a specific "glue"-type code, the transparent interface mechanism can be utilized to function an as XML bridge to a specific content converter or reactor. (That is, the interface mechanism can be used to bridge between the XML format of the documents used within the script and other native formats that may be used by a process invoked in the hand-off processing, such as properties of objects; the interface mechanism thus converts from XML and reacts to received data for converting back to XML.) Using the process registry information and the middleware programming interfaces, it can interact (on behalf of the script) with sources owned by the middleware (MQ, in the case of the example). This mechanism makes it easier to integrate various back-end sources. The application processing architecture provided by this invention separates the traditional thinking of business logic into two distinct pieces. One is about data exchange and process flow and the other is about data access and transaction processing. This separation is key to easing the complexity of handling system growth issues such as system merges, service request redirection, content redistribution, workload balancing, server upgrades, and so forth.

One way in which a transparent conversion (i.e. one in which code does not need to be written) may be provided between the XML documents used by the scripts of the present invention and the non-XML data formats required by foreign processes invoked in the present invention's hand-off processing is to use an emerging Internet technology called "Web Services". Web Services are self-contained Internet applications that can be published and invoked over a network such as the World Wide Web. The Web Service architecture provides three roles: service provider, service requester, and service broker. An application can implement all three roles. Two document types are defined to describe Web Services: a Well Defined Service (WDS) document describing general service information, such as service description and company information, and a Web Service Description Language (WDSL) document describing the operational aspect of the service, such as the message format and invocation endpoints. IBM provides a Web Services Toolkit for designing and executing Web Service applications. Although this toolkit is designed for the World Wide Web environment, it can also be used to implement the proper hand-off interface mechanism of the present invention. Specifically, the destination descriptions in the resource definition file could be in WDSL. The interface mechanism could implement service providers on behalf of the application and data middleware sources, implement service requesters for invoking these sources on behalf of the scripting logic, and implement service brokers to register and publish the providers and control the return of information to the hand-off process. More information about the Web Services toolkit may be found at http://www.alphaworks.ibm.com/tecb/webservicestoolkit.

As has been demonstrated, the techniques of the present invention define a powerful yet simple way to define and manage the data and processing interactions of e-business services. Changes to the service definitions, such as changes to the structure of a task's processing or the relationships among sub-services of a task, can be made quite easily by using a text editing tool. No recompilation, which is typically required with prior art techniques, is necessary when making such changes with the present invention. As an added benefit, defining the services and sub-service interrelationships in XML documents separates the business logic from the programming model so that different people can focus on different jobs, based on their expertise. Flexibility of choosing the system and middleware infrastructure to process the document exchange is provided. Using the automatic data transformations and process integration techniques made possible by the present invention, solution development and deployment becomes faster and easier. Use of a standardized structured markup language such as XML makes this technique platform independent, thereby maximizing its advantages in the open distributed environment in which e-business is conducted. New and improved business functionality can be rapidly deployed at an e-business site without reworking existing applications.

A paper entitled "Business to business integration with trading partner agreements", which may be found at http://www.ibm.com/developer/xml/tpaml/b2b-integration-with-tpa.pdf, describes a prior art technique for B2B integration using a Business-to-Business Protocol Framework (BPF). However, there are a number of differences between the present invention and the techniques described in this tpa/BPF paper. These will now be briefly described for clarifying the advantages of the present invention.

First, the present invention can be distinguished as a specific method for automating XML data exchange and processing integration. The present invention can be used with the techniques described in the tpa/BPF paper, as well as with other frameworks including less complicated XML data-driven processing models. The tpa/BPF paper describes a conventional architecture and programming model, treating XML as a type of data format but requiring programmers to use a particular set of IBM products (including MQSeries. MQ Workflow, Websphere Application Server, Connectors, Tools, and so forth) to create a solution. In contrast, the present invention leverages the predictable nature of XML data formats to provide automatic document recognition, data transformation, routing, interactions, and process linking such that software or service providers (i.e. their system architects and programmers) can implement complex business logic in simple scripting operations, in a new business model. The present invention can be built on any standard XML technology available to the industry, and does not require a particular set of vendor products.

The tpa/BPF paper describes using "modifiable business rules" to route information. However, these modifiable rules are user code that is generated via tools to fit into the particular environment provided by the required toolset. (Code generation tools are provided with the BPF that create code which is specifically adapted to its architecture.) The rules and other programming pieces associated with a Unit of Business (UOB) in the tpa/BPF technique are separated in different places, and are compiled together using tools into an MQ Workflow application. A special tool is provided which analyzes these rules. In contrast, the present invention requires minimal tool support because it relies on the self-describing nature of XML. All aspects associated with a UOB may be described in an XML document that provides a natural flow. A common engine is provided, such that no user code is needed. The logic implemented using the present invention will also be easily portable between the various partner systems because it is not adapted to specific software products. Moreover, since the logic created when using the present invention is separate from user and middleware code, the engine can be replaced easily (as long as the new engine supports the same XML grammar). The present invention provides a common, platform-neutral and system-neutral component to facilitate B2B data and process integration on top of various existing partner systems that might be quite different, whereas the tpa/BPF approach uses a specific infrastructure based upon MQ.

The tpa/BPF paper discusses filtering and combining interaction events. However, this is in reference to an MQ-specific message processing node programming model in which a filter node routes messages based on message content and/or database lookup, and which also provides a general compute node that can be used for performing application logic with the messages. The present invention, on the other hand, does not go to MQ at the B2B exchange level. Rather, it passes an XML document to MQ after the external aspects of the document have been ascertained and the document has been processed (assuming that MQ is the destination registered for internal processing).

In summary, the tpa/BPF technique is a lower-level coding model that is defined for use in a particular computing environment which includes particular software products, whereas the technique of the present invention uses a high-level scripting model that is independent of a particular infrastructure or framework and which is therefore very well suited to the requirements of a global marketplace.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

APPENDIX A.1

The XML Data Exchange Service Automation DTD

<!--Document Type Definition for XML tags used for automated B2B services interactions-->
<!--Copyright 2000 International Business Machines Corporation.-->
<!--In a B2B environment where a group of partners have agreed on an electronic process to conduct business interactions, the process can be implemented as an XML Service Automation script on the individual partner's system. The script describes a set of interactions and data exchanges this partner will carry out with others. It represents an atomic unit of work in a business transaction with other partners that may elapse over a period of time. For example, a wholesale business needs to receive purchase orders from a retail chain, acknowledge the orders, send suppliers backorders, receive confirmations from suppliers, and send shipment notifications to the retail chain. The script use XML as the standard format for data exchange. It describes not only external interactions but also the intermediate transformations of data before handing off to a local process or external partners. This is a simple way for a business to implement its part of the B2B communications with other partners, with only a minimal amount of heads down coding required (if any). The following XML tags provide a common format for describing B2B data exchanges and interactions in a finite state model. Each state starts with a description of the XML data it needs to process. It will take an action to transform and/or send the data to the next destination and wait on the response XML data to return. The state identifies all the possible next states that could happen based on the action. When the response data comes in, the state with the matching data description will become the next state. The process iterates until it has reached the end of script. More information about the tags is described individually below.-->
<!--The eServiceDefinition element:-->
<!--An eServiceDefinition document contains a series of ServiceUnit elements. Each ServiceUnit represents a state of the B2B partner interactions. It includes the XML data content to be received, actions to take, and expected next states from the actions. The eServiceDefinition document drives the partner interactions through the ServiceUnits, transforming data to a proper form to hand over to a local process or send to external partners iteratively until the sequence of interactions is complete.-->
<!--The eServiceDefinition element has a list of attribute values containing general descriptive information for the script:

| name | optional, the name of this script |
|---|---|
| description | optional, descriptive information about the script |
| author | optional, the name of the author |
| creationdate | optional, the date the script was created |
| resource | optional, the name of a companion resource definition document which contains the definitions of element or attribute resources not defined in this script, e.g. local processes, external partners, transformation methods, etc. |
| Unsolicited | optional, the name of a ServiceUnit which is given control when an unrecognized document is encountered |
| timeout | optional, maximum time in days for the script to remain inactive, i.e. waiting for an interaction state to occur. If time expires the script goes to the error state. Default is "0", meaning the script can remain inactive forever --> |

<!ELEMENT eServiceDefinition (ServiceUnit+)>
<!ATTLIST eServiceDefinition
  name CDATA #IMPLIED
  description CDATA #IMPLIED
  author CDATA #IMPLIED
  creationdate CDATA #IMPLIED
  resource CDATA #IMPLIED
  unsolicited CDATA #IMPLIED
  timeout CDATA "0">
<!--The ServiceUnit element:-->
<!--A ServiceUnit element describes an interaction state. It includes the XML data content to be received, actions to take, and expected next states from the actions. It contains four required or optional elements in the order of comment, description, actions, and nextServices. There could be multiple ServiceUnit elements in an eServiceDefinition element-->
<!--Every ServiceUnit element has a set of attribute values describing the types of ServiceUnit in eServiceDefinition:

| name | required, the unique name of the ServiceUnit |
|---|---|
| suspend | optional, time in days to indicate how long this unit may wait for its data to arrive. This behavior is normal in the B2B environment. It is useful to handle asynchronous interactions. The default is "0", meaning the unit expects no wait on data. --> |

<!ELEMENT ServiceUnit (comment?, description, actions, nextServices?)>
<!ATTLIST ServiceUnit
  name CDATA #REQUIRED suspend CDATA "0">
<!--A comment element contains a character data element specifying appropriate user comment for this ServiceUnit. This element is optional and can be used as the static state message area.-->
<!ELEMENT comment (#PCDATA)>
<!--The description element:-->
<!--A description element describes an interaction state represented by the XML data content expected. The content is recognized by one or more xmldata elements, custom logic, or unconditionally by anything. An XML document that matches the descriptions is recognized as being in this state. Since the primary use of the script is for well-formatted data, matching selected xml elements is an effective way of recognizing the XML document content. Note just matching the XML document name may not be enough to describe the content that needs to be recognized. This element is required.-->
<!--The description element has a set of attribute values describing a quick identification for the XML document:

| | |
|---|---|
| dtd | optional, a dtd name used to identify the type of document. Default is "null", meaning the document can by any type |
| id | optional, a character string to identify the id attribute value on the root element of the document. Default is "null", meaning ignore any id attribute on the root element   --> |

<!ELEMENT description (xmldata*|customreco?)>
<!ATTLIST description
   dtd CDATA #IMPLIED
   id CDATA #IMPLIED>
<!--An xmldata element contains several xml_attribute elements to describe an xml element. This element is optional.-->
<!--The xmldata element has a set of attribute values describing supplemental matching conditions for this xml element:

| | |
|---|---|
| tag | optional, the name of the xml tag. Default is "null", meaning the tag name is ignored, or any tag name will match |
| level | optional, level of this tag in the document, e.g. 1 means the root element. The default is "0", meaning any level as it appears in the document. |
| xpathindex | optional, index of this element via a path from the root element, e.g. 1.1.2.* means any child element of the second grandchild of the root element. The default is "0", meaning any element as it appears in the document at the specified level |
| group | optional, the group name where any match of the tags in the group is treated the same as a match for this tag. E.g. if tags A, B, and C are in a group together, then a match of any one of them will be treated as though the match conditions set for A, B, and C have been met. The default is "null", meaning the tag is on its own. |
| invertmatch | optional, "true\|false" indicating whether the matching of the tag is inverted, i.e. a match if the tag is not present. Default is "false" --> |

<!ELEMENT xmldata (xml_attribute*)>
<!ATTLIST xmldata
   tag CDATA #IMPLIED
   level CDATA #IMPLIED
   xpathindex CDATA #IMPLIED
   group CDATA #IMPLIED
   invertmatch (true|false) "false">

<!--An xml_attribute element contains a character data element specifying an attribute value to match. This element is optional.-->
<!--Every xml_attribute element has a set of attribute values describing a match condition:

| | |
|---|---|
| name | required, the name of the attribute |
| value | optional, the value of the attribute. Default is "null", meaning any value will match |
| group | optional, the group name where any match of the attribute in the group is treated the same as a match for this attribute. E.g. if attributes A, B, and C are in a group together, then a match of any one of them will be treated as though the match conditions set for A, B, and C have been met. The default is "null", meaning the attribute is on its own. |
| invertmatch | optional, "true\|false" indicating whether the matching of the attribute is inverted, i.e. a match if the attribute is not present or does not match the value. Default is "false" --> |

<!ELEMENT xml_attribute (#PCDATA)>
<!ATTLIST xml_attribute
   name CDATA #REQUIRED
   value CDATA #IMPLIED
   group CDATA #IMPLIED
   invertmatch (true|false) "false">
<!--A customreco element contains a character data element specifying a custom description to match. This element is optional.-->
<!--The customreco element has an attribute value describing a match condition:
   ID—required, the unique identifier of the custom description element-->
<!ELEMENT customreco (#PCDATA)>
<!ATTLIST customreco
   ID (CDATA) #REQUIRED>
<!--End of the description element-->
<!--The actions element:-->
<!--An actions element describes a set of actions to be taken against the matched interaction state. This element is required. It contains an optional transform element to transform the current XML document to new document, and an optional send element to send the transformed documents to a destination which can be a local process, another script, or an external system. An empty actions element signals the end of the script.-->
<!ELEMENT actions (transform?, send?)>
<!--A transform element contains one of several target elements to transform the current XML document to the target documents (a one-to-many type of transform). The method used is defined either as an inline transformation via an operation element or in the resource definition document specified in the eServiceDefinition element. The transformation can be synchronized with a customer extension logic waiting on the content. The extension affects only the content of attribute values and element context. Further customization of the XML document requires a hand-off to other processes via a send. This element is optional and only one transform element can be included under the actions element.-->

<!--The transform element has a set of attribute values to direct the transform:

| | |
|---|---|
| method | optional, indicate a transformation method name defined in the resource definition document associated with this script. Default is "null", meaning to use the inline method specified in the operation element. If no resource definition document is associated, the method name should be an inline operation name defined in this script. The value "implicit" is reserved for the script to figure out from the resource document which method to use based on the current and target XML contents. Three types of method are provided:<br>INLINE            transformation via callable services<br>STYLESHEET   transformation via a specified XSLT<br>CUSTOM          transformation via custom code |
| customExt | optional, indicates a custom command string to invoke after the transformation is performed. The script passes all the target documents to the command and waits for it to return before continuing the rest. Default is "null", meaning no command is invoked  --> |

<!ELEMENT transform (operation?, target+)>
<!ATTLIST transform
   method CDATA #IMPLIED
   customExt CDATA #IMPLIED>
<!--An operation element contains one or more map elements defining an inline transformation method. Each map represents a primitive transformation, such as ADD, DELETE, FILTER, etc., from the current XML content to a new XML content. Inline operation provides high performance transformation for XMLs that conform to well-formatted DTDs, i.e. where tags are always present. The maps are executed sequentially. This element is optional and only one operation element can be included in the transform element.-->
<!--The operation element has an attribute value describing its name:

| | |
|---|---|
| name | optional, a name for this operation that can be referenced by other parts of the script to reuse this operation  --> |

<!ELEMENT operation (map+)>
<!ATTLIST operation
   name CDATA #IMPLIED>
<!--A map element contains one or more param elements to describe a simple mapping from the current XML document to the target document. Each param element contains a pair of source (current XML) and target values used by the map. This element is required and multiple map elements can be included in the operation element.-->
<!--The map element has one attribute value describing the primitive transformation operation to be performed:

| | |
|---|---|
| opcode | required, "ADD\|DELETE\|COPY\|FILTER\|REORDER\|RENAME\|COMBINE\|CONVERT E2A\|CONVERT A2E", the primitive transformation operation code from source to target:<br>ADD              add selected nodes<br>DELETE        delete selected nodes<br>COPY            copy selected nodes<br>MOVE           move selected nodes<br>FILTER          separate selected nodes to multiple targets<br>REORDER      reorder the children sequence for a node<br>RENAME       rename selected nodes<br>MERGE         merge selected nodes with other nodes in target<br>CONVERTe2a   convert selected nodes into attributes<br>CONVERTa2e   convert attributes of selected nodes into new nodes  --> |

<!ELEMENT map (param+)>
<!ATTLIST map
   opcode (CDATA) #REQUIRED>
<!--A param element contains a pair of elements defining the relationship of the source and target nodes involved in the map. The snode defines qualified source nodes for the map operation. The tnode defines the resulting target nodes and placements from the map. This element is required and multiple param elements can be included in the map element.-->
<!--The param element has a set of attribute values describing map parameters:

| | |
|---|---|
| snode | required, a source element for the map |
| tnode | required, a target element for the map  --> |

<!ELEMENT param (snode, tnode)>
<!--The snode element:-->
<!--An snode element contains an xmldata element to describe the XML data content to use as a source for the map operation. This element is required.-->
<!--The snode element has a set of attribute values describing the source node characteristics:

| | |
|---|---|
| doc | optional, a name used to identify a transformation source document. Default is "null", meaning the source document is the current transforming XML document |
| collatekey | optional, an attribute name for collating the source and target nodes, for example, merge under a common purchase order number from a partial purchase order document to a full document. Default is "null", meaning no collation is specified |
| pathback | optional, number of backward path levels to preserve when the source node is mapped to the target node, e.g. 2 means to go back two levels from the current node. The default is "0", meaning don't preserve the path information  --> |

<!ELEMENT snode (xmldata)>
<!ATTLIST snode
   doc CDATA #IMPLIED
   collatekey CDATA #IMPLIED
   pathback CDATA #IMPLIED>
<!--The tnode element:-->
<!--A mode element contains a tag element, zero or more attribute elements and an anchor element to describe the resulting target nodes for the map operation. This element is required.-->
<!--The tnode element has a set of attribute values describing the target node characteristics:

| | |
|---|---|
| doc | optional, a name used to identify a transformation target document. Default is "null", meaning the target document is what is specified in the subsequent target element |
| collatekey | optional, an attribute name for collating the source and target nodes, for example, merge under a common purchase order number from a partial purchase order document to a full document. Default is "null", meaning no collation is specified  --> |

```
<!ELEMENT tnode (tag?, attribute*, anchor?)>
<!ATTLIST tnode
   doc CDATA #IMPLIED
   collatekey CDATA #IMPLIED>
<!--A tag element contains a character data element specify-
   ing the mapped tag name. This element is optional. If not
   specified, the source node name is the mapped tag name.-->
<!ELEMENT tag (#PCDATA)>
<!--An attribute element contains a character data element
   specifying the map of attribute name and values from the
   source node to the target node. This element is optional. If
   not specified, all attributes from the source are mapped to
   the target.-->
<!--The attribute element has a set of attribute values describ-
   ing the mapping of target node attributes:
```

| | |
|---|---|
| name | required, an attribute name for the target node |
| value | required, a value for the attribute, can be character data or valid xpath expressions, for example, @id means the value of the id attribute from the source node --> |

```
<!ELEMENT attribute (#PCDATA)>
<!ATTLIST attribute
   name CDATA #REQUIRED
   value CDATA #REQUIRED>
<!--An anchor element contains an xmldata element to
   describe the placement of the mapped node in the target
   document. This element is optional. If not specified, the
   anchor is determined based on the tag name from the tem-
   plate or from nodes already mapped into the target docu-
   ment. For example, a source node with path preserved to
   target nodes already mapped.-->
<!--The anchor element has a set of attribute values describ-
   ing the anchor position for the mapped target node from its
   preserved path:
```

| | |
|---|---|
| rel | optional, "SIBLING\|PARENT\|CHILD\|SELF", the relationship between the target node and the anchor element: |
| | SIBLING the anchor is a sibling of the target node |
| | PARENT the anchor is the parent of the target node |
| | CHILD the anchor is a child of the target node |
| | SELF the anchor is the target node itself, default |
| place | optional, "TOP\|BOTTOM\|BEFORE\|AFTER\|*", the placement of the target node with respect to its anchor: |
| | TOP place the target node at the top of its kind |
| | BOTTOM place the target node at the bottom of its kind |
| | BEFORE place the target node before the current anchor |
| | AFTER place the target node after the current anchor |
| | * place the target node where the anchor is, default --> |

```
<!ELEMENT anchor (xmldata)>
<!ATTLIST anchor
   rel CDATA #IMPLIED
   place CDATA #IMPLIED>
<!--A target element contains a character data element speci-
   fying the name of an XML document where the transfor-
   mation result is kept. This element is required and multiple
   target elements can be included in the transform element.
   Multiple targets resulting from a transformation could
   therefore trigger execution of multiple subsequent Servi-
   ceUnits. The script therefore provides automatic multi-
   threading support under the covers. Script designers can
   use the hand off process (i.e. the send element) to synchro-
   nize or route multiple XML documents to various destina-
   tions-->
<!--The target element has a set of attribute values describing
   target document characteristics:
```

| | |
|---|---|
| dtd | optional, a dtd name used to define the target document. Default is "null", meaning the target document will be a natural progression of the incoming XML data through the application of subsequent maps |
| template | optional, a template name for initiating the target document. Default is "null", meaning to initiate with an empty document |
| persistent | optional,"yes\|no", indicates whether the target document should be stored in permanent storage. If "yes" is specified, the document will be stored using the XML document name or the file name associated with the XML document defined in the resource definition file --> |

```
<!ELEMENT target (#PCDATA)>
<!ATTLIST target
   dtd CDATA #IMPLIED
   template CDATA #IMPLIED
   persistent (yes|no) "no">
<!--A send element contains one or several destination ele-
   ments to send the transformed documents to foreign pro-
   cesses (i.e. outside of the control of the script) which could
   either be on the local or an external partner system. The
   send hands off the documents to these processes and
   returns to the script immediately. The processes are
   expected to respond later with the XML documents the
   nextServices element of this ServiceUnit is waiting for.
   Thus, the send is by default asynchronous. The local pro-
   cesses can be database, MQ, host applications, etc. with an
   XML interface provided for the linkage. Documents sent to
   external partners are expected by the eServiceDefinition
   scripts at their ends (i.e. at the partner). This element is
   optional and only one send element can be included in the
   actions element.-->
<!ELEMENT send (destination+)>
<!--A destination element contains a character data element
   specifying a destination name for sending a document.
   This element is required and multiple destination elements
   can be included in the send actions element.-->
<!--The destination element has a set of attribute values
   describing a custom action:
```

| | |
|---|---|
| document | optional, the name of the XML document to send. Default is "null", meaning the current transformed document(s) |
| type | optional, "local\|external\|eService", indicating whether it is a local or external destination or another eServiceDefinition script. The default is "external" --> |

```
<!ELEMENT destination (#PCDATA)>
<!ATTLIST destination
   document (CDATA) #IMPLIED
   type (local|external|eService) "external">
<!--End of the actions element-->
<!--A nextServices element contains a series of service ele-
   ment names. Each represents a possible ServiceUnit to be
   invoked, resulting from the actions taken against the cur-
   rent XML document.-->
```

<!--The nextServices element has a set of attribute values describing a branch condition:

| | |
|---|---|
| branch | optional, "single\|multiple" indicating whether there could be multiple branches or not. The default is "single", meaning only one branch condition will occur |
| timeout | optional, time in seconds to wait for a non-suspended response to occur in a single branch. If the time expires, the script goes to the error state. The default is "0", meaning a continuous wait. --> |

<!ELEMENT nextServices (service)+>
<!ATTLIST nextServices
  branch (single|multiple) "single" timeout (CDATA) #IMPLIED>
<!--A service element contains a character data element specifying the possible next ServiceUnit to invoke from actions taken against the current ServiceUnit-->
<!--The service element has an attribute value describing a next ServiceUnit:

| | |
|---|---|
| timeout | optional, time in seconds to wait for this branch to occur in case of a suspended response. This overrides the timeout attribute for the entire eServiceDefinition. The default is "0", meaning a continuous wait. --> |

<!ELEMENT service (#PCDATA)>
<!ATTLIST service timeout (CDATA) #LMPLIED>
<!--End of the ServiceUnit element-->
<!--End of the eServiceDefinition element-->

APPENDIX A.2

Wholesale Order Customer Service Script

<!--eServiceDefinitionCustomerService.xml-->
<!--Company name: eABC, Wholesaler-->
<!--The initial part of the wholesale customer order processing-->
<!--This script describes the initial part of the wholesale processing. It receives individual customer orders and consolidate them into a common list to hand off to the main wholesale order processing at scheduled intervals. The interval is set long enough such that there will always be customer orders to process. This process can run on a different system than the main wholesale processing, handling order requests at sites that are close to the retail stores who place the orders while passing the requests to the main wholesale site for processing. It is an ideal B2B proxy service to be put on an edge of a distributed network.

An associated resource definition XML document, eServiceResurceWholesaleOrder, contains information about the resources used in this script, such as Dtds, Xmls, Transformations, Destinations, etc. Each ServiceUnit describes a state of the processing. Unmatched states are forwarded to the unsolicited ServiceUnit, exitNormal, for normal returns.-->

<eServiceDefinition
  resource="eServiceResourceWholesaleOrder"
  unsolicited="exitNormal">
<!--starting point: create a work list and initialize the local customer service process to wait on the incoming orders. The local process is a server application that receives external order submissions through standard mechanisms such as an html form. It returns the submissions as XML documents to this script and does not require any work list from this script to be passed to it.-->

```
<ServiceUnit name="startCustomerService">
    <description />
    <actions>
        <transform>
            <operation name="createPOWorklist">
                <map opcode="ADD">
                    <param>
                        <snode>
                            <xmldata tag="customerPurchaseOrders" level="1" />
                        </snode>
                        <tnode />
                    </map>
                </operation>
                <target dtd="cPOs">customerPOs_worklist</target>
            </transform>
            <send>
                <destination type="local">customerService_init</destination>
            </send>
        </actions>
        <nextServices>
            <service>receiveOrder</service>
        </nextServices>
</ServiceUnit>
```

<!--customer order handling: receives customer order, update order status to "received", and branch to notify the customer and wait for more orders.-->

```
<ServiceUnit name="receiveOrder">
    <description dtd="cPO" />
    <actions>
        <transform customExt="assign(ordernumber,date)">
            <operation name="addPOSummary">
                <map opcode="COPY">
                    <param>
                        <snode>
                            <xmldata tag="PORequest" level="2" />
                        </snode>
                        <tnode />
                    </param>
                </map>
            </operation>
            <target dtd="cPO" template="customerPOwork">customerPO_summary</target>
        </transform>
        <send>
            <destination type="local">customerService_notify</destination>
```

-continued

```
    </send>
  </actions>
  <nextServices branch="multiple">
    <service>notifyCustomer</service>
    <service>waitNextOrder</service>
  </nextServices>
</ServiceUnit>
```

<!--notify customer under one thread—hand the PO work copy off to the customer service with the "received" status added to notify the customer. The customer service is expected to return promptly to free up this thread. Note this unit is entered directly from the receiveOrder unit in this script. There is no need to check the XML document produced in receiveOrder here.-->

```
<ServiceUnit name="notifyCustomer">
  <description />
  <actions>
    <send>
      <destination type="local">customerService_notify</destination>
    </send>
  </actions>
  <nextServices />
</ServiceUnit>
```

<!--wait for the next order under a separate thread: add the PO received to the work list and wait for either the next order to come or time to process the work list. Note this unit is entered directly from the receiveOrder unit in this script. There is no need to check the XML document produced in receiveOrder here.-->

```
<ServiceUnit name="waitNextOrder">
  <description />
  <actions>
    <transform>
      <operation name="addtoWorklist">
        <map opcode="ADD">
          <param>
            <snode>
              <xmldata tag="customerPurchaseOrder" level="1" />
            </snode>
            <tnode doc="customerPOs_worklist />
              <anchor rel="PARENT" place="BOTTOM">
                <xmldata tag="customerPurchaseOrders" level="1">
              </anchor>
          </param>
        </map>
      </operation>
      <target dtd="cPOs" persistent="yes">customerPOs_worklist</target>
    </transform>
    <send>
      <destination type="local">customerService_wait</destination>
    </send>
  </actions>
  <nextServices>
    <service>receiveOrder</service>
    <service>processOrders</service>
  </nextServices>
</ServiceUnit>
```

<!--scheduled interval for processing the work order list: pass the list to the middle part of the wholesale order processing by handing off to the eServiceDefinitionWholesaleOrder script. This unit is a logical break point for putting the customer order receiving function on the edge of the network. Note instead of the customer PO document, the customer service unit returns a simple XML postPOs document the wait state to trigger this service unit.-->

```
<ServiceUnit name="processOrders">
  <description>
    <xmldata tag="postPOs" />
  </description>
  <action>
    <send>
      <destination document="customerPOs_worklist" type="eService">WholesaleOrder</destination>
    </send>
  </action>
  <nextServices>
    <service>resetWorklist</service>
  </nextServices>
</ServiceUnit>
```

<!--clean up the work list for the next interval.-->

```
<ServiceUnit name="resetWorklist">
  <description />
  <actions>
    <transform>
      <operation name="clearPOWorklist">
        <map opcode="DELETE">
          <param>
            <snode doc="customerPOs_worklist">
              <xmldata tag="customerPurchaseOrder" level="2" />
            </snode>
            <tnode />
          </param>
        </map>
      </operation>
      <target dtd="cPOs">customerPOs_worklist</target>
    </transform>
    <send>
      <destination type="local">customerService_wait</destination>
    </send>
  </actions>
  <nextServices>
    <service>receiveOrder</service>
  </nextServices>
</ServiceUnit>
```

<!--unsolicited service unit, entered if any unrecognized serviceunit state is encountered. Here it simply returns normally.-->

```
<ServiceUnit name="exitNormal">
  <description />
  <actions>
    <send>
      <destination type="local">customerService_term</destination>
    </send>
  </actions>
  <nextServices />
</ServiceUnit>
</eServiceDefinition>
```

APPENDIX A.3

Wholesale Order Main Script

```
<!--eServiceDefinitionWholesaleOrder.xml-->
<!--Company name: eABC, Wholesaler-->
<!--The middle part of the wholesale customer order process-
    ing-->
<!--This script describes the middle part of the wholesale
    processing. It takes in a consolidated list of customer pur-
    chase orders, separates internal and external fulfillment
    requirements, processes them separately and obtains their
    responses, and passes them to shipping and handling after
    they become ready. An associated resource definition XML
    document, eServiceResurceWholesaleOrder, contains
    information about the resources used in this script, such as
    Dtds, Xmls, Transformations, Destinations, etc. Each Ser-
    viceUnit describes a state of the processing. Unmatched
    states are forwarded to the unsolicited ServiceUnit, exit-
    Normal, for normal returns.-->
<eServiceDefinition
    resource="eServiceResourceWholesaleOrder"
    unsolicitated="exitNormal">
<!--starting point, spilt internal and external items from a list
    of customer POs to pass them to separate internal and
    external PG processing. An inline transformation called
    splitOrders splits the incoming xml document into two
    parts for the separate (internal and external) processing.
    The original xml document is maintained as a master cus-
    tomer POs document and provides a synchronization point
    to hold the history of the order processing.-->

<ServiceUnit name="routeOrderRequests">
        <description>
            <xmldata tag="customerPurchaseOrders" level="1" />
            <xmldata tag="customerPurchaseOrder" level="2" />
            <xmldata tag="PORequest" level="3">
                <xml_attribute name="customerID" />
                <xml_attribute name="date" />
            </xmldata>
            <xmldata tag="Item" level="4">
                <xml_attribute name="description" />
                <xml_attribute name="catalog_number" />
                <xml_attribute name="quantity" />
            </xmldata>
        </description>
        <actions>
            <transform method="splitOrders">
                <target dtd="iPO" template=
                "internalFulfillment">internalPOs</traget>
                <traget dtd="xPO" template=
                "externalFulfillment">externalPos</target>
            </transform>
        </actions>
        <nextServices branch="multiple">
            <service>internalFulfillment</service>
            <service>externalFulfillment</service>
        </nextServices>
    </ServiceUnit>

<!--internal PO processing under its own thread, passes the
    internal PG items list to a local process without further
    transformation and waits for the response (which could
    occur several days later). The local process will update the
    master custom POs directly to reflect the internal process-
    ing event.-->

<ServiceUnit name="internalFulfillment">
    <description>
        <xmldata tag="internalPurchaseOrders" level="1" />
    </description>
    <actions>
        <send>
            <destination document="internalFulfillment" type="local" />
        </send>
    </actions>
    <nextServices>
        <service timeout="2">internalFulfillmentSummary</service>
    </nextServices>
</ServiceUnit>

<!--external PO processing under its own thread, transforms
    the external PO item list to a Vendor PG form to send it to
    the vendor and waits for the response (which could occur
    several days later). A custom transformation is used here to
    relate the customer order numbers and items with the ven-
    dor order number and items. The custom transformation
    will also update the master custom POs document directly
    to reflect the vendor processing event. After involving the
    vendor, a test is performed to see if any items are returned
    such that they need to be fulfilled via another vendor.
    Otherwise this service unit will wait for the response when
    the vendor has fulfilled the order. The time to wait is set
    according to an existing partner agreement.-->

<ServiceUnit name="externalFulfillment">
    <description>
        <xmldata tag="externalPurchaseOrders" level="1" />
    </description>
    <actions>
        <transform method="customVendorOrder">
            <target dtd="vPO" persistent="yes">vendorPO1</traget>
        </transform>
        <send>
            <destination name="www.xyzappliance.com" type="external">
        </send>
    </actions>
    <nextServices branch="multiple">
        <service timeout="1">secondaryExternalFulfillment</service>
        <service timeout="5">externalFulfillmentSummary</service>
    </nextServices>
</ServiceUnit>

<!--secondary vendor processing under the external PO pro-
    cessing thread, receives a returned item from the first ven-
    dor and transforms it to another vendor form to send it to
    the secondary vendor and wait for the response several
    days later. Similar to the primary external PO unit above, a
    custom transformation is used here. The secondary vendor
    always guarantees the fulfillment.-->

<ServiceUnit name="secondaryExternalFulfillment" suspend="yes">
    <description>
        <xmldata tag="vendorPurchaseOrder" level="1">
            <xml_attribute name="status" value="RCVD" />
            <xml_attribute name="code" value="16" />
        </xmldata>
    </description>
    <actions>
        <transform method="secondaryCustomerVendorPO">
            <target dtd="vPO" persistent="yes">vendorPO2</traget>
        </transform>
        <send>
            <destination name="www.oldfaithful.com" type="external">
```

-continued

```
        </send>
    </actions>
    <nextServices>
        <service timeout="5">externalFulfillmentSummary</service>
    </nextServices>
</ServiceUnit>
```

<!--internal PO fulfilled processing, receives the internal PO summary from the local process and merges the order status received with the master customer POs document through an inline transformation. A custom code extension is used to update the full order status. The transformed customer POs document is passed immediately to the place that synchronizes all the responses from the internal and external order processing.-->

```
<ServiceUnit name="internalFulfillmentSummary" suspend="yes">
    <description>
        <xmldata tag="internalPurchaseOrders" level="1" />
        <xmldata tag="POSummary" level="3">
            <xml_attribute name="status" value="REDY" />
        </xmldata>
    </description>
    <action>
        <transform method=
            "addReadyOrders" customExt="updateFullOrderStatus.class">
            <target dtd="cPO" template=
            "customerPOs" persistent="yes">customerPOs</traget>
        </transform>
    </action>
    <nextServices timeout="1.5">
        <service>orderFulfillmentSummary</service>
    </nextServices>
</ServiceUnit>
```

<!--external PO fulfilled processing, receives the vendor PG summary from vendors and merges the order status received with the master customer POs document through a custom transformation. The same custom code extension above is used to update the full order status. The transformed customer POs document is passed immediately to the place that synchronize all the responses from the internal and external order processing.-->

```
<ServiceUnit name="externalFulfillmentSummary" suspend="yes">
    <description>
        <xmldata tag="vendorPurchaseOrder" level="1" />
        <xmldata tag="POSummary" level="2">
            <xml_attribute name="status" value="BILL" />
        </xmldata>
    </description>
    <action>
        <transform method=
            "customVendorPO" customExt="updateFullOrderStatus.class">
            <target dtd="cPO" template=
            "customerPOs" persistent="yes">customerPOs</traget>
        </transform>
    </action>
    <nextServices timeout="1.5">
        <service>orderFullfillmentSummary</service>
    </nextServices>
<ServiceUnit>
```

<!--normal ending point, receives the customer POs documents from the internal and external summary points and verifies all items are ready for shipping and handling. If so, it concludes the middle part of the wholesale order processing by handing off to the eServiceDefinitioneS&H script. Note the internal and external order summary units specify this unit as the next place to go after merging the individual ready order status into the master custom POs document. This unit defines the matching condition needed to enter this state, which only the summary unit to complete the last order item will satisfy. It is the sync point since the beginning of splitting the order processing (i.e. to have all of them back in one place). The other summary units will simply enter the exitNormal unit and return normally.-->

```
<ServiceUnit name="orderFulfillmentSummary">
    <description>
        <xmldata tag="customerPurchaseOrders" level="1" />
        <xmldata tag="POSummary" level="3">
            <xml_attribute name="status" value="REDY" />
        </xmldata>
    </description>
    <action>
        <send>
            <destination name="S&H" type="eService" />
        </send>
    </action>
    <nextServices />
</ServiceUnit>
```

<!--unsolicited service unit, entered if any unrecognized serviceunit state is encountered. Here it simply returns normally.-->

```
<ServiceUnit name="exitNormal">
    <description />
    <actions />
    <nextServices />
</ServiceUnit>
</eServiceDefinition>
```

APPENDIX A.4

Wholesale Order Shipping & Handling Script

<!--eServiceDefinitionS&H.xml-->
<!--Company name: eABC, Wholesaler-->
<!--The final part of the wholesale customer order processing-->
<!--This script describes the final part of the wholesale processing. It receives a list of consolidated customer orders that are ready for shipment from the main wholesale order processing. The list is handed off to a local process that interfaces with a warehouse system using information from the list. This process can run on a different system than the main wholesale processing, handling order delivery requests at a site that is close to the warehouse inventory system. It is an ideal B2B proxy service to be put on the edge of an enterprise data center.
An associated resource definition XML document, eServiceResourceWholesaleOrder, contains information about the resources used in this script, such as Dtds, Xmls, Transformations, Destinations, etc. Each ServiceUnit describes a state of the processing. Unmatched states are forwarded to the unsolicited ServiceUnit, exitNormal, for normal returns.-->
<eServiceDefinition name="customerS&H" resource="eServiceResourceWholesaleOrder">
<!--starting point: pass the incoming order work list to the local warehouse process and wait on its completion to continue the invoice processing. The local process is built on top of an existing warehouse system that handles the shipping and receiving of merchandise. It updates the status and returns the list back to the script once the merchandise is shipped.-->

```
<ServiceUnit name="warehouseDelievery">
    <description>
        <xmldata tag="customerPurchaseOrders" level="1" />
        <xmldata tag="POSummary" level="3">
            <xml_attribute name="status" value="REDY" />
        </xmldata>
    </description>
    <action>
        <send>
            <destination name="wharehouse" type="local" />
        </send>
    </action>
    <nextServices>
        <service timeout="2">customerInvoice</service>
    </nextServices>
</ServiceUnit>
```

<!--invoice: this is the finishing point for the wholesale processing. It receives the order work list back from the local warehouse process after orders have been shipped. The order status information will be transformed into invoice information and passed to customer service to generate invoice tickets for the customer service to mail to customers.-->

```
<ServiceUnit name="customerInvoice" suspend="yes">
    <description>
        <xmldata tag="customerPurchaseOrders" level="1" />
        <xmldata tag="POSummary" level="3">
            <xml_attribute name="status" value="SHIP" />
        </xmldata>
    </description>
    <action>
        <transform customExt="assign(date, unitprice, total)">
            <operation name="prepareInvoice">
                <map opcode="RENAME">
                    <param>
                        <snode>
                            <xmldata tag="shiporder" level="4" />
                        </snode>
                        <tnode>
                            <tag>invoice</tag>
                        </tnode>
                    </param>
                </map>
                <map opcode="ADD">
                    <param>
                        <snode>
                            <xmldata tag="" />
                            <xml_attribute name="total" value="" />
                        </snode>
                        <tnode>
                            <tag>invoice</tag>
                            <anchor rel="SELF">
                                <xmldata tag="invoice" level="4" />
                            </anchor>
                        </tnode>
                    </param>
                    <param>
                        <snode>
                            <xmldata tag="" />
                            <xml_attribute name="unitprice" value="" />
                        </snode>
                        <tnode>
                            <tag>Item</tag>
                            <anchor rel="SELF">
                                <xmldata tag="Item" xpathindex="1.*.2.1.*" />
                            </anchor>
                        </tnode>
                    </param>
                    <param>
                        <snode>
                            <xmldata tag="" />
                            <xml_attribute name="status" value="BILL" />
                        </snode>
                        <tnode>
                            <tag>POSummary</tag>
                            <anchor rel="SELF">
                                <xmldata tag="POSummary" level="3" />
                            </anchor>
                        </tnode>
                    </param>
                    <param>
                        <snode>
                            <xmldata tag="event">
                                <xml_atribute name="date" value="">
                                <xml_attribute name="type" value="BILL">
                            </xmldata>
                        </snode>
                        <tnode>
                            <anchor rel="PARENT" place="BOTTOM">
                                <xmldata tag="log" xpathindex="1.*.2.2" />
                            </anchor>
                        </tnode>
                    </param>
                </map>
            </operation>
            <target dtdt="cPOs" template=
            "customerPOs" persistent="yes">customerPOs</traget>
        </transform>
        <send>
            <destination name="customerService_invoice" type="local" />
        </send>
    </action>
    <nextServices />
</ServiceUnit>
```

<!--unsolicited service unit, entered if any unrecognized serviceunit state is encountered. Here it simply returns normally.-->

```
<ServiceUnit name="exitNormal">
    <description />
    <actions />
    <nextServices />
</ServiceUnit>
</eServiceDefinition>
```

APPENDIX A.5

Wholesale Processing Resource Definition

```
<!-- eServiceResourceWholesaleOrder.xml -->
<eServiceResource creationdate="06012000">
    <Destinations>
        <!-- eService type -->
```

```xml
<destination name="WholesaleOrder" type="eService">
    <inputxml dtd="cPOs" />
    <outputxml dtd="cPOs" />
    <invocation>
        <eServiceDefinition name="eServiceDefinitionWholesaleOrder" />
    </invocation>
</destination>
<destination name="S&H" type="eService">
    <inputxml dtd="cPOs" />
    <outputxml dtd="cPOs" />
    <invocation>
        <eServiceDefinition name="eServiceDefinitionS&H" />
    </invocation>
</destination>
<!-- local type -->
<destination name="customerService_init" type="local">
    <inputxml />
    <outputxml dtd="cPO" />
    <invocation>
        <class name="com.myCompany.customerService.class" method="init" />
    </invocation>
</destination>
<destination name="customerService_notify" type="local">
    <inputxml dtd="cPO" />
    <outputxml />
    <invocation>
        <class name="com.myCompany.customerService.class" method="notify" />
    </invocation>
</destination>
<destination name="customerService_wait" type="local">
    <inputxml />
    <outputxml dtd="cPO" />
    <outputxml />
    <invocation>
        <class name="com.myCompany.customerService.class" method="wait" />
    </invocation>
</destination>
<destination name="customerService_term" type="local">
    <inputxml />
    <outputxml />
    <invocation>
        <class name="com.myCompany.customerService.class" method="term" />
    </invocation>
</destination>
<destination name="internalFulfillment" type="local">
    <inputxml dtd="iPOs">internalPOs<inputxml>
    <outputxml dtd="iPOs">internalPOs_summary</outputxml>
    <invocation>
        <class name="com.myCompany.internalFulfillment.class" method="execute" />
    </invocation>
</destination>
<destination name="warehouse" type="local">
    <inputxml dtd="cPOs" />
    <outputxml dtd="cPOs" />
    <invocation>
        <class name="com.myCompany.warehouse.class" method="main" />
    </invocation>
</destination>
<destination name="customerService_invoice" type="local">
    <inputxml dtd="cPOs" />
    <outputxml dtd="cPOs" />
    <invocation>
        <class name="com.myCompany.customerServiceInvoice.class" method="main" />
    </invocation>
</destination>
<!-- external type -->
<destination name="www.xyzappliance.com" type="external">
    <inputxml dtd="vPO">vendorPO1<inputxml>
    <outputxml dtd="vPO">vendorPOsummary_xyzappliance2</outputxml>
    <invocation>
        <http url="www.xyzappliance.com/partners/eServices" />
    </invocation>
</destination>
<destination name="www.oldfaithful.com" type="external">
    <inputxml dtd="vPO">vendorPO2<inputxml>
    <outputxml dtd="vPO">vendorPOsummary_oldfaithful</outputxml>
    <invocation>
        <http url="www.oldfaithful.com/partners/eServices" />
    </invocation>
```

```
            </destination>
         </Destinations>
         <Transformations>
            <transformation>
               <method name="splitOrders" type="INLINE" />
            </transformation>
            <transformation>
               <method name="addReadyOrders" type="INLINE" />
            </transformation>
            <transformation>
               <method name="xxxxx" type="STYLESHEET">name of a stylesheet</method>
            </transformation>
            <transformation>
               <method name="customVendorPO"
type="CUSTOM">com.myCompany.customVendorPO.class</method>
            </transformation>
            <transformation>
               <method name="secondaryCustomVendorPO"
type="CUSTOM">com.myCompany.customVendorPO2.class</method>
            </transformation>
         </Transformations>
```

<!--Split internal and external orders from an incoming master custom POs document: delete the log element first from the incoming custom POs document, and filter based on Item description values into internal POs and external POs documents-->

```
<Operations>
   <operation name="splitOrders">
      <map opcode="DELETE">
         <param>
            <snode>
               <xmldata tag="log" level="4" />
            </snode>
            <tnode />
         </param>
      </map>
      <map opcode="FILTER">
         <param>
            <snode>
               <xmldata tag="Item" level="4" pathback="2">
                  <xml_attribute name=
                     "description" value="tv-19" group="external" />
                  <xml_attribute name=
                     "description" value="vcr" group="external" />
               </xmldata>
            </snode>
            <tnode doc="externalPOs">
               <tag>Item</tag>
               <anchor rel="PARENT">
                  <xmldata tag="externalPurchaseOrders" level="1" />
               </anchor>
            </tnode>
         </param>
         <param>
            <snode pathback="1">
               <xmldata tag="POSummary" level="3" />
            </snode>
            <tnode doc="externalPOs" />
         </param>
```

```
         </param>
         <param>
            <snode>
               <xmldata tag="Item" level="4">
                  <xml_attribute name=
                     "description" value="tv-19" invertmatch="ture" />
                  <xml_attribute name=
                     "description" value="vcr" invertmatch="true" />
               </xmldata>
            </snode>
            <tnode doc="internalPOs">
               <tag>Item</tag>
               <anchor rel="PARENT">
                  <xmldata tag="internalPurchaseOrders" level="1" />
               </anchor>
            </tnode>
         </param>
         <param>
            <snode pathback="1">
               <xmldata tag="POSummary" level="3" />
            </snode>
            <tnode doc="internalPOs" />
         </param>
      </map>
   </operation>
```

<!--Add internal order ready status to the master custom POs document:
   merge the POSummary element from the incoming internal POs summary document with the master custom POs document into a new custom POs document using the ordernumber attribute value as the collate key,
   and
   copy the merged Item elements into event elements under the log element in the new document.-->

```
<operation name="addReadyOrders">
   <map opcode="MERGE">
      <param>
         <snode collatekey="ordernumber">
            <xmldata tag="POSummary" level="3" />
         </snode>
         <tnode doc="customerPOs" collatekey="ordernumber">
            <tag>POSummary</tag>
            <anchor rel="SELF">
               <xmldata tag="POSummary" level="3" />
            </anchor>
```

```
            </tnode>
        </param>
    </map>
    <map opcode="COPY">
        <param>
            <snode>
                <xmldata tag="Item" xpathindex="1.*.2.1.*" />
            </snode>
            <tnode doc="customerPOs">
                <tag>event</tag>
                <atribute name="itemid" value="@id">
                <atribute name="date" value="../@date">
                <atribute name="type" value="REDY">
                <anchor rel="PARENT" place="BOTTOM">
                    <xmldata tag="log" xpathindex="1.*.2.2" />
                </anchor>
            </tnode>
        </param>
    </map>
</operation>
<operation name="prepareBilling">
    <map opcode="MERGE">
        <param>
            <snode collatekey="ordernumber">
                <xmldata tag="POSummary" level="3" />
            </snode>
            <tnode doc="customerPOs" collatekey="ordernumber">
                <tag>POSummary</tag>
                <anchor rel="SELF">
                    <xmldata tag="POsummary" level="3" />
                </anchor>
            </tnode>
        </param>
    </map>
    <map opcode="COPY">
        <param>
            <snode>
                <xmldata tag="Item" xpathindex="1.*.2.1.*" />
            </snode>
            <tnode doc="customerPOs">
                <tag>event</tag>
                <atribute name="itemid" value="@id">
                <atribute name="date" value="../@date">
                <atribute name="type" value="REDY">
                <anchor rel="PARENT" place="BOTTOM">
                    <xmldata tag="log" xpathindex="1.*.2.2" />
                </anchor>
            </tnode>
        </param>
    </map>
</operation>
</Operations>
<XmlDocs>
    <xmlDoc name="customerPOs">customerPOs_master.xml</xmlDoc>
    <xmlDoc name="internalPOs">internalPOs.xml</xmlDoc>
    <xmlDoc name="internalPOs_summary">internalPOs_summary.xml</xmlDoc>
    <xmlDoc name="externalPOs">externalPOs.xml</xmlDoc>
    <xmlDoc name="vendorPO1">vendorPO_xyzappliance.xml</xmlDoc>
    <xmlDoc name="vendorPO2">vendorPO_oldfaithful.xml</xmlDoc>
    <xmlDoc name="vendorPOsummary_xyzappliance">vendorPOsummary_xyzappliance.xml</xmlDoc>
    <xmlDoc name="vendorPOsummary_oldfaithful">vendorPOsummary_oldfaithful.xml</xmlDoc>
</Xmls>
<Dtds>
    <dtd name="cPO">customerPurchaseOrder.dtd</dtd>
    <dtd name="cPOs">customerPurchaseOrders.dtd</dtd>
    <dtd name="iPOs">internalPurchaseOrders.dtd</dtd>
    <dtd name="xPOs">externalPurchaseOrders.dtd</dtd>
    <dtd name="vPO">vendorPurchaseOrder.dtd</dtd>
</Dtds>
<Templates>
    <template name="internalFulfillment">internalFulfillmentTemplate.xml</template>
    <template name="externalFulfillment">externalFulfillmentTemplate.xml</template>
    <template name="customerPOs">customerPOs_master.xml</template>
    <template name="customerPOwork">POworkTemplate.xml</template>
</Templates>
</eServiceResource>
```

APPENDIX A.6

Customer Purchase Order 1

```
<!--Customer PO Doe, initially received from customer
    storeUSA-->
<customerPurchaseOrder>
    <PORequest           customerName="storeUSA"
        customerID="c1000001" date="06152000">
        <Item      id="1"       description="basketball"
            catalog_number="SPXB0001" quantity="10"/>
        <Item      id="2"       description="baseball"
            catalog_number="SPXB0002" quantity="120"/>
        <Item      id="3"    description="toaster    oven"
            catalog_number="APXH0001" quantity="6"/>
        <Item        id="4"          description="tv-19"
            catalog_number="APXH0002" quantity="12"/>
        <Item         id="5"           description="vcr"
            catalog_number="APXH0003" quantity="12"/>
    </PORequest>
</customerPurchaseOrder>
```

APPENDIX A.7

Customer Purchase Order 2

```
<!--Customer PO Doc, initially received from customer
    USA-mart-->
<customerPurchaseOrder>
    <PORequest           customerName="USA-mart"
        customerID="c1000002" date="06152000">
        <Item      id="1"       description="soccerball"
            catalog_number="SPXB0003" quantity="20"/>
        <Item       id="2"        description="bicycle"
            catalog_number="SPXB0004" quantity="10"/>
        <Item     id="3"    description="microwave   oven"
            catalog_number="APXH0004" quantity="6"/>
        <Item         id="4"         description="tv-19"
            catalog_number="APXH0002" quantity="6"/>
    </PORequest>
</customerPurchaseOrder>
```

APPENDIX A.8

Total Customer Purchase Orders, After Received

```
<!--PO process Master Doc, after initial orders received-->
<customerPurchaseOrders>
    <customerPurchaseOrder>
        <PORequest          customerName="storeUSA"
            customerID="c1000001" date="06152000">
            <Item     id="1"      description="basketball"
                catalog_number="SPXB0001" quantity="10">
            <Item      id="2"      description="baseball"
                catalog_number="SPXB0002" quantity="120"/>
            <Item     id="3"   description="toaster   oven"
                catalog_number="APXH0001" quantity="6"/>
            <Item       id="4"        description="tv-19"
                catalog_number="APXH0002" quantity="12"/>
            <Item        id="5"          description="vcr"
                catalog_number="APXH0003" quantity="12"/>
        </PORequest>
        <POSummary          ordernumber="E0000001"
            status="RCVD">
            <log>
                <event date="06152000" type="RCVD"/>
            </log>
        </POSummary>
    </customerPurchaseOrder>
    <customerPurchaseOrder>
        <PORequest          customerName="USA-mart"
            customerID="c1000002" date="06152000">
            <Item      id="1"      description="soccerball"
                catalog_number="SPXB0003" quantity="20"/>
            <Item       id="2"       description="bicycle"
                catalog_number="SPXB0004" quantity="10">
            <Item    id="3"   description="microwave   oven"
                catalog_number="APXH0004" quantity="6"/>
            <Item        id="4"        description="tv-19"
                catalog_number="APXH0002" quantity="6"/>
        </PORequest>
        <POSummary          ordernumber="E0000002"
            status="RCVD">
            <log>
                <event date="06152000" type="RCVD"/>
            </log>
        <IPOSummary>
    </customerPurchaseOrder>
</customerPurchaseOrders>
```

APPENDIX A.9

Internal Purchase Orders

```
<!--Intermediate PO processing Doc, separated initial
    orders-->
<internalPurchaseOrders>
    <customerPurchaseOrder>
        <PORequest          customerName="storeUSA"
            customerID="c1000001" date="06152000">
            <Item     id="1"      description="basketball"
                catalog_number="SPXB0001" quantity="10">
            <Item      id="2"      description="baseball"
                catalog_number="SPXB0002" quantity="120"/>
            <Item     id="3"   description="toaster   oven"
                catalog_number="APXH0001" quantity="6"/>
        </PORequest>
        <POSummary          ordernumber="E0000001"
            status="RCVD">
    </customerPurchaseOrder>
    <customerPurchaseOrder>
        <PORequest          customerName="USA-mart"
            customerID="c1000002" date="06152000">
            <Item      id="1"      description="soccerball"
                catalog_number="SPXB0003" quantity="20"/>
            <Item       id="2"       description="bicycle"
                catalog_number="SPXB0004" quantity="10">
        </PORequest>
        <POSummary          ordernumber="E0000002"
            status="RCVD">
    </customerPurchaseOrder>
</internalPurchaseOrders>
```

APPENDIX A.10

External Purchase Orders

```
<!--Intermediate PO processing Doc, separated external
    orders-->
<externalPurchaseOrders>
    <customerPurchaseOrder>
        <PORequest          customerName="storeUSA"
            customerID="c1000001" date="06152000">
```

```
        <Item      id="4"      description="tv-19"
            catalog_number="APXH0002" quantity="12"/>
        <Item      id="5"      description="vcr"
            catalog_number="APXH0003" quantity="12"/>
    </PORequest>
    <POSummary       ordernumber="E0000001"
        status="RCVD">
</customerPurchaseOrder>
<customerPurchaseOrder>
    <PORequest     customerName="USA-mart"
        customerID="c1000002" date="06152000">
        <Item   id="3"   description="microwave   oven"
            catalog_number="APXH0004" quantity="6"/>
        <Item      id="4"      description="tv-19"
            catalog_number="APXH0002" quantity="6"/>
    </PORequest>
    <POSummary       ordernumber="E00000012"
        status="RCVD">
</customerPurchaseOrder>
</externalPurchaseOrders>
```

APPENDIX A.11

Vendor Purchase Order

```
<!--Vendor PO Doc, send to xyzappliance after external
orders isolated-->
<vendorPurchaseOrder>
    <PORequest    customerName="eABC    Wholesale"
        customerID="w1000001" date="06152000">
        <Item      id="1"      description="tv-19"
            catalog_number="APXH0002" quantity="12"/>
        <Item      id="2"      description="vcr"
            catalog_number="APXH0003" quantity="12"/>
        <Item   id="3"   description="microwave   oven"
            catalog_number="APXH0004" quantity="6"/>
        <Item      id="4"      description="tv-19"
            catalog_number="APXH0002" quantity="6"/>
    </PORequest>
</vendorPurchaseOrder>
```

APPENDIX A.12

Vendor Returned Purchase Order

```
<!--Vendor PO response Doc, received from xyzappliance
after orders received-->
<vendorPurchaseOrder>
    <PORequest    customerName="eABC    Wholesale"
        customerID="w1000001" date="06152000">
        <Item      id="1"      description="tv-19"
            catalog_number="APXH0002" quantity="12"/>
        <Item      id="2"      description="vcr"
            catalog_number="APXH0003" quantity="12"/>
        <Item   id="3"   description="microwave   oven"
            catalog_number="APXH0004" quantity="6"/>
        <Item      id="4"      description="tv-19"
            catalog_number="APXH0002" quantity="6"/>
    </PORequest>
    <POSummary       ordernumber="V0000001"
        status="RCVD" code="16">
        <returnorder date="06122000>
        <Item   id="3"   description="microwave   oven"
            catalog_number="APXH0004" quantity="6"/>
        </returnorder>
<!--note the following log element is internal to the vendor
system
included here for illustrative purpose only-->
    <log>
        <event date="06162000" type="RCVD"/>
        <event date="06162000" type="RTRN" itemid="3"
            code="16"/>
    <log>
    </POSummary>
</vendorPurchaseOrder>
```

APPENDIX A.13

Secondary Vendor Purchase Order

```
<!--Vendor PG Doc, sent to oldfaithful for orders xyzappli-
ance can not fulfill-->
<vendorPurchaseOrder>
    <PORequest    customerName="eABC    Wholesale"
        customerID="w1000001" date="06162000">
        <Item   id="1"   description="microwave   oven"
            catalog_number="APXH0004" quantity="6"/>
    </PORequest>
</vendorPurchaseOrder>
```

APPENDIX A.14

Total Customer Purchase Orders, After Involving Vendors

```
<!--PG process Master Doc, after internal fulfillment and
vendors notified-->
<customerPurchaseOrders>
    <customerPurchaseOrder>
        <PORequest          customerName="storeUSA"
            customerID="c1000001" date="06152000">
            <Item      id="1"      description="basketball"
                catalog_number="SPXB0001" quantity="10"/>
            <Item      id="2"      description="baseball"
                catalog_number="SPXB0002" quantity="120"/>
            <Item   id="3"   description="toaster   oven"
                catalog_number="APXH0001" quantity="6"/>
            <Item      id="4"      description="tv-19"
                catalog_number="APXH0002" quantity="12"/>
            <Item      id="5"      description="vcr"
                catalog_number="APXH0003" quantity="12"/>
        </PORequest>
        <POSummary       ordernumber="E0000001"
            status="VEND">
            <log>
                <event date="06152000" type="RCVD"/>
                <event   date="06152000"   type="ITRN"
                    itemid="1"/>
                <event   date="06152000"   type="ITRN"
                    itemid="2"/>
                <event   date="06152000"   type="ITRN"
                    itemid="3"/>
                <event   date="06152000"   type="VEND"
                    vendor="xyzappliance" itemid="4"/>
                <event   date="06152000"   type="VEND"
                    vendor="xyzappliance" itemid="5"/>
            <log>
        </POSummary>
    </customerPurchaseOrder>
    <customerPurchaseOrder>
        <PORequest     customerName="USA-mart"
            customerID="c1000002" date="06152000">
            <Item      id="1"      description="soccerball"
                catalog_number="SPXB0003" quantity="20"/>
            <Item      id="2"      description="bicycle"
                catalog_number="SPXB0004" quantity="10"/>
```

```
      <Item id="3" description="microwave oven"
         catalog_number="APXH0004" quantity="6"/>
      <Item id="4" description="tv-19"
         catalog_number="APXH0002" quantity="6"/>
   </PORequest>
   <POSummary ordernumber="E0000002"
         status="VEND">
      <log>
         <event date="06152000" type="RCVD"/>
         <event date="06152000" type="ITRN"
            itemid="1"/>
         <event date="06152000" type="ITRN"
            itemid="2"/>
         <event date="06152000" type="VEND"
            vendor="xyzappliance" itemid="3"
            code="16"/>
         <event date="06152000" type="VEND"
            vendor="xyzappliance" itemid="4"/>
         <event date="06172000" type="VEND"
            vendor="oldfaithful" itemid="3"/>
      </log>
   </POSummary>
</customerPurchaseOrder>
</customerPurchaseOrders>
```

APPENDIX A.15

Internal Purchase Orders Response

```
<!--Intermediate PO processing Doc, initial orders ready for
   fulfillment-->
<internalPurchaseOrders>
   <customerPurchaseOrder>
      <PORequest customerName="storeUSA"
         customerID="c1000001" date="06152000">
         <Item id="1" description="basketball"
            catalog_number="SPXB0001" quantity="10"/>
         <Item id="2" description="baseball"
            catalog_number="SPXB0002" quantity="120"/>
         <Item id="3" description="toaster oven"
            catalog_number="APXH0001" quantity="6"/>
      </PORequest>
      <POSummary ordernumber="E0000001"
         status="REDY">
         <readyorder date="06172000">
            <Item id="1" description="basketball"
               catalog_number="SPXB0001"
               quantity="10"/>
            <Item id="2" description="baseball"
               catalog_number="SPXB0002"
               quantity="120"/>
            <Item id="3" description="toaster oven"
               catalog_number="APXH0001" quantity="6"/>
         </readyorder>
      </POSummary>
   </customerPurchaseOrder>
   <customerPurchaseOrder>
      <PORequest customerName="USA-mart"
         customerID="c1000002" date="06152000">
         <Item id="1" description="soccerball"
            catalog_number="SPXB0003" quantity="20"/>
         <Item id="2" description="bicycle"
            catalog_number="SPXB0004" quantity="10"/>
      </PORequest>
      <POSummary ordernumber="E0000002"
         status="REDY">
         <readyorder date="06172000">
            <Item id="1" description="soccerball"
               catalog_number="SPXB0003"
               quantity="20"/>
            <Item id="2" description="bicycle"
               catalog_number="SPXB0004"
               quantity="10"/>
         </readyorder>
      </POSummary>
   </customerPurchaseOrder>
</internalPurchaseOrders>
```

APPENDIX A.16

Vendor 1 Purchase Order Response

```
<!--Vendor PO response Doc, received from xyzappliance
   after orders fulfilled-->
<vendorPurchaseOrder>
   <PORequest customerName="eABC Wholesale"
      customerID="w1000001" date="06152000">
      <Item id="1" description="tv-19"
         catalog_number="APXH0002" quantity="12"/>
      <Item id="2" description="vcr"
         catalog_number="APXH0003" quantity="12"/>
      <Item id="3" description="microwave oven"
         catalog_number="APXH0004" quantity="6"/>
      <Item id="4" description="tv-19"
         catalog_number="APXH0002" quantity="6"/>
   </PORequest>
   <POSummary ordernumber="V0000001" status="BILL"
         code="4">
      <invoice date="06282000" total="630">
         <Item id="1" description="tv-19"
            catalog_number="APXH0002" quantity="12"
            unitprice="30"/>
         <Item id="2" description="vcr"
            catalog_number="APXH0003" quantity="12"
            unitprice="15"/>
         <Item id="4" description="tv-19"
            catalog_number="APXH0002" quantity="6" unit-
            price="15"/>
      <invoice>
      <returnorder>
         <Item id="3" description="microwave oven"
            catalog_number="APXH0004" quantity="6"/>
      </returnorder>
<!--note the following log element is internal to the vendor
   system
   included here for illustrative purpose only-->
      <log>
         <event date="06162000" type="RCVD"/>
         <event date="06162000" type="RTRN" itemid="3"
            code="16"/>
         <event date="06262000" type="SHIP" itemid="1"/>
         <event date="06262000" type="SHIP" itemid="2"/>
         <event date="06262000" type="SHIP" itemid="4"/>
         <event date="06282000" type="BILL"/>
      <log>
   </POSummary>
</vendorPurchaseOrder>
```

APPENDIX A.17

Vendor 2 Purchase Order Response

```
<!--Vendor PO response Doe, received from oldfaithful after
  USA-mart-->
<vendorPurchaseOrder>
  <PORequest customerName="eABC Wholesale"
    customerID="w1000001" date="06162000">
    <Item id="1" description="microwave oven"
      catalog_number="APXH0004" quantity="6"/>
  </PORequest>
  <POSummary ordernumber="V0000002"
    status="BILL">
    <invoice date="06252000" total="180">
      <Item id="1" description="microwave oven"
        catalog_number="APXH0004" quantity="6" unit-
        price="30"/>
    </invoice>
<!--note the following log element is internal to the vendor
  system
  included here for illustrative purpose only-->
    <log>
      <event date="06172000" type="RCVD"/>
      <event date="06232000" type="SHIP" itemid="1"/>
      <event date="06252000" type="BILL"/>
    </log>
  </POSummary>
</vendorPurchaseOrder>
```

APPENDIX A.18

Total Customer Purchase Orders, After Ready for Shipment

```
<!--PO process Master Doc, after orders are ready for ship-
  ment-->
<customerPurchaseOrders>
  <customerPurchaseOrder>
    <PORequest customerName="storeUSA"
      customerID="c1000001" date="06152000">
      <Item id="1" description="basketball"
        catalog_number="SPXB0001" quantity="10"/>
      <Item id="2" description="baseball"
        catalog_number="SPXB0002" quantity="120"/>
      <Item id="3" description="toaster oven"
        catalog_number="APXH0001" quantity="6"/>
      <Item id="4" description="tv-19"
        catalog_number="APXH0002" quantity="12"/>
      <Item id="5" description="vcr"
        catalog_number="APXH0003" quantity="12"/>
    </PORequest>
    <POSummary ordernumber="E0000001"
      status="REDY">
      <readyorder date="06282000">
        <Item id="1" description="basketball"
          catalog_number="SPXB0001" quan-
          tity="10"/>
        <Item id="2" description="baseball"
          catalog_number="SPXB0002" quan-
          tity="120"/>
        <Item id="3" description="toaster oven"
          catalog_number="APXH0001" quantity="6"/>
        <Item id="4" description="tv-19"
          catalog_number="APXH0002" quan-
          tity="12"/>
        <Item id="5" description="vcr"
          catalog_number="APXH0003" quan-
          tity="12"/>
      </readyorder>
      <log>
        <event date="06152000" type="RCVD"/>
        <event date="06152000" type="ITRN"
          itemid="1"/>
        <event date="06152000" type="ITRN"
          itemid="2"/>
        <event date="06152000" type="ITRN"
          itemid="3"/>
        <event date="06152000" type="VEND"
          vendor="xyzappliance" itemid="4"/>
        <event date="06152000" type="VEND"
          vendor="xyzappliance" itemid="5"/>
        <event date="06172000" type="REDY"
          itemid="1"/>
        <event date="06172000" type="REDY"
          itemid="2"/>
        <event date="06172000" type="REDY"
          itemid="3"/>
        <event date="06282000" type="REDY"
          itemid="4"/>
        <event date="06282000" type="REDY"
          itemid="5"/>
      </log>
    </POSummary>
  </customerPurchaseOrder>
  <customerPurchaseOrder>
    <PORequest customerName="USA-mart"
      customerID="c1000002" date="06152000">
      <Item id="1" description="soccerball"
        catalog_number="SPXB0003" quantity="20"/>
      <Item id="2" description="bicycle"
        catalog_number="SPXB0004" quantity="10"/>
      <Item id="3" description="microwave oven"
        catalog_number="APXH0004" quantity="6"/>
      <Item id="4" description="tv-19"
        catalog_number="APXH0002" quantity="6"/>
    </PORequest>
    <POSummary ordernumber="E0000002"
      status="REDY">
      <readyorder date="07032000" total="950">
        <Item id="1" description="soccerball"
          catalog_number="SPXB0003" quan-
          tity="20"/>
        <Item id="2" description="bicycle"
          catalog_number="SPXB0004" quan-
          tity="10"/>
        <Item id="3" description="microwave oven"
          catalog_number="APXH0004" quantity="6"/>
        <Item id="4" description="tv-19"
          catalog_number="APXH0002" quantity="6"/>
      </readyorder>
      <log>
        <event date="06152000" type="RCVD"/>
        <event date="06152000" type="ITRN"
          itemid="1"/>
        <event date="06152000" type="ITRN"
          itemid="2"/>
        <event date="06152000" type="VEND"
          vendor="xyzappliance" itemid="3"
          code="16"/>
        <event date="06152000" type="VEND"
          vendor="xyzappliance" itemid="4"/>
        <event date="06172000" type="VEND"
          vendor="oldfaithful" itemid="3"/>
        <event date="06172000" type="REDY"
          itemid="1"/>
```

```
        <event    date="06172000"    type="REDY"
            itemid="2"/>
        <event    date="06252000"    type="REDY"
            itemid="3"/>
        <event    date="06282000"    type="REDY"
            itemid="4"/>
      </log>
    </POSummary>
  </customerPurchaseOrder>
</customerPurchaseOrders>
```

APPENDIX A.19

Total Customer Purchase Orders, After Customer Shipping

```
<!--PO process Master Doe, after customer orders have been shipped out-->
<customerPurchaseOrders>
  <customerPurchaseOrder>
    <PORequest    customerName="storeUSA"
        customerID="c1000001" date="06152000">
      <Item    id="1"    description="basketball"
          catalog_number="SPXB0001" quantity="10"/>
      <Item    id="2"    description="baseball"
          catalog_number="SPXB0002" quantity="120"/>
      <Item    id="3"    description="toaster    oven"
          catalog_number="APXH0001" quantity="6"/>
      <Item    id="4"    description="tv-19"
          catalog_number="APXH0002" quantity="12"/>
      <Item    id="5"    description="vcr"
          catalog_number="APXH0003" quantity="12"/>
    </PORequest>
    <POSummary    ordernumber="E0000001"
        status="SHIP">
      <shiporder date="07032000">
        <Item    id="1"    description="basketball"
            catalog_number="SPXB0001"    quan-
            tity="10"/>
        <Item    id="2"    description="baseball"
            catalog_number="SPXB0002"    quan-
            tity="120"/>
        <Item    id="3"    description="toaster    oven"
            catalog_number="APXH0001" quantity="6"/>
        <Item    id="4"    description="tv-19"
            catalog_number="APXH0002"    quan-
            tity="12"/>
        <Item    id="5"    description="vcr"
            catalog_number="APXH0003"    quan-
            tity="12"/>
      </shiporder>
      <log>
        <event date="06152000" type="RCVD"/>
        <event    date="06152000"    type="ITRN"
            itemid="1"/>
        <event    date="06152000"    type="ITRN"
            itemid="2"/>
        <event    date="06152000"    type="ITRN"
            itemid="3"/>
        <event    date="06152000"    type="VEND"
            vendor="xyxappliance" itemid="4"/>
        <event    date="06152000"    type="VEND"
            vendor="xyzappliance" itemid="5"/>
        <event    date="06172000"    type="REDY"
            itemid="1"/>
        <event    date="06172000"    type="REDY"
            itemid="2"/>
        <event    date="06172000"    type="REDY"
            itemid="3"/>
        <event    date="06282000"    type="REDY"
            itemid="4"/>
        <event    date="06282000"    type="REDY"
            itemid="5"/>
        <event    date="06302000"    type="SHIP"
            itemid="1"/>
        <event    date="06302000"    type="SHIP"
            itemid="2"/>
        <event    date="063    02000"    type="SHIP"
            itemid="3"/>
        <event    date="06302000"    type="SHIP"
            itemid="4"/>
        <event    date="06302000"    type="SHIP"
            itemid="5"/>
      </log>
    </POSummary>
  </customerPurchaseOrder>
  <customerPurchaseOrder>
    <PORequest    customerName="USA-mart"
        customerID="c1000002" date="06152000">
      <Item    id="1"    description="soccerball"
          catalog_number="SPXB0003" quantity="20"/>
      <Item    id="2"    description="bicycle"
          catalog_number="SPXB0004" quantity="10"/>
      <Item    id="3"    description="microwave    oven"
          catalog_number="APXH0004" quantity="6"/>
      <Item    id="4"    description="tv-19"
          catalog_number="APXH0002" quantity="6"/>
    </PORequest>
    <POSummary    ordernumber="E0000002"
        status="SHIP">
      <shiporder date="07032000">
        <Item    id="1"    description="soccerball"
            catalog_number="SPXB0003"    quan-
            tity="20"/>
        <Item    id="2"    description="bicycle"
            catalog_number="SPXB0004"    quan-
            tity="10"/>
        <Item id="3" description="microwave    oven"
            catalog_number="APXH0004" quantity="6"/>
        <Item    id="4"    description="tv-19"
            catalog_number="APXH0002" quantity="6"/>
      </shiporder>
      <log>
        <event date="06152000" type="RCVD"/>
        <event    date="06152000"    type="ITRN"
            itemid="1"/>
        <event    date="06152000"    type="ITRN"
            itemid="2"/>
        <event    date="06152000"    type="VEND"
            vendor="xyzappliance"    itemid="3"
            code="16"/>
        <event    date="06152000"    type="VEND"
            vendor="xyzappliance" itemid="4"/>
        <event    date="06172000"    type="VEND"
            vendor="oldfaithful" itemid="3"/>
        <event    date="06172000"    type="REDY"
            itemid="1"/>
        <event    date="06172000"    type="REDY"
            itemid="2"/>
        <event    date="06252000"    type="REDY"
            itemid="3"/>
        <event    date="06282000"    type="REDY"
            itemid="4"/>
```

```
            <event      date="06302000"      type="SHIP"
                itemid="1"/>
            <event      date="06302000"      type="SHIP"
                itemid="2"/>
            <event      date="06302000"      type="SHIP"
                itemid="3"/>
            <event      date="06302000"      type="SHIP"
                itemid="4"/>
        </log>
    </POSummary>
  </customerPurchaseOrder>
</customerPurchaseOrders>
```

APPENDIX A.20

Total Customer Purchase Orders, After Customer Billing

```
<!--PO process Master Doe, after customers have been billed-->
<customerPurchaseOrders>
  <customerPurchaseOrder>
    <PORequest            customerName="storeUSA"
        customerID="c1000001" date="06152000">
      <Item      id="1"      description="basketball"
          catalog_number="SPXB0001" quantity="10"/>
      <Item      id="2"      description="baseball"
          catalog_number="SPXB0002" quantity="120"/>
      <Item      id="3"      description="toaster    oven"
          catalog_number="APXH0001" quantity="6"/>
      <Item      id="4"      description="tv-19"
          catalog_number="APXH0002" quantity="12"/>
      <Item      id="5"      description="vcr"
          catalog_number="APXH0003" quantity="12"/>
    </PORequest>
    <POSummary            ordernumber="E0000001"
        status="BILL">
      <invoice date="07032000" total="1790">
        <Item      id="1"      description="basketball"
            catalog_number="SPXB0001"    quantity="10"
            unitprice="5"/>
        <Item      id="2"      description="baseball"
            catalog_number="SPXB0002" quantity="120"
            unitprice="5"/>
        <Item      id="3"      description="toaster    oven"
            catalog_number="APXH0001"    quantity="6"
            unitprice="10"/>
        <Item      id="4"      description="tv-19"
            catalog_number="APXH0002" quantity="12"
            unitprice="60"/>
        <Item      id="5"      description="vcr"
            catalog_number="APXH0003" quantity="12"
            unitprice="30"/>
      </invoice>
      <log>
        <event date="06152000" type="RCVD"/>
        <event      date="06152000"      type="ITRN"
            itemid="1"/>
        <event      date="06152000"      type="ITRN"
            itemid="2"/>
        <event      date="06152000"      type="ITRN"
            itemid="3"/>
        <event      date="06152000"      type="VEND"
            vendor="xyzappliance" itemid="4"/>
        <event      date="06152000"      type="VEND"
            vendor="xyzappliance" itemid="5"/>
        <event      date="06172000"      type="REDY"
            itemid="1"/>
        <event      date="06172000"      type="REDY"
            itemid="2"/>
        <event      date="06172000"      type="REDY"
            itemid="3"/>
        <event      date="06282000"      type="REDY"
            itemid="4"/>
        <event      date="06282000"      type="REDY"
            itemid="5"/>
        <event      date="06302000"      type="SHIP"
            itemid="1"/>
        <event      date="06302000"      type="SHIP"
            itemid="2"/>
        <event      date="06302000"      type="SHIP"
            itemid="3"/>
        <event      date="06302000"      type="SHIP"
            itemid="4"/>
        <event      date="06302000"      type="SHIP"
            itemid="5"/>
        <event date="07032000" type="BILL"/>
        <event date=" " type="PMNT"/>
      </log>
    </POSummary>
  </customerPurchaseOrder>
  <customerPurchaseOrder>
    <PORequest            customerName="USA-mart"
        customerID="c1000002" date="06152000">
      <Item      id="1"      description="soccerball"
          catalog_number="SPXB0003" quantity="20"/>
      <Item      id="2"      description="bicycle"
          catalog_number="SPXB0004" quantity="10">
      <Item      id="3"      description="microwave  oven"
          catalog_number="APXH0004" quantity="6">
      <Item      id="4"      description="tv-19"
          catalog_number="APXH0002" quantity="6"/>
    </PORequest>
    <POSummary            ordernumber="E0000002"
        status="BILL">
      <invoice date="07032000" total="950">
        <Item      id="1"      description="soccerball"
            catalog_number="SPXB0003"    quantity="20"
            unitprice="8"/>
        <Item      id="2"      description="bicycle"
            catalog_number="SPXB0004"    quantity="10"
            unitprice="75"/>
        <Item id="3" description="microwave  oven"
            catalog_number="APXH0004"    quantity="6"
            unitprice="60"/>
        <Item      id="4"      description="tv-19"
            catalog_number="APXH0002"    quantity="6"
            unitprice="65"/>
      </invoice>
      <log>
        <event date="06152000" type="RCVD"/>
        <event      date="06152000"      type="ITRN"
            itemid="1"/>
        <event      date="06152000"      type="ITRN"
            itemid="2"/>
        <event      date="06152000"      type="VEND"
            vendor="xyzappliance"          itemid="3"
            code="16"/>
        <event      date="06152000"      type="VEND"
            vendor="xyzappliance" itemid="4"/>
        <event      date="06172000"      type="VEND"
            vendor="oldfaithful" itemid="3"/>
        <event      date="06172000"      type="REDY"
            itemid="1"/>
```

```
        <event    date="06172000"    type="REDY"
            itemid="2"/>
        <event    date="06252000"    type="REDY"
            itemid="3"/>
        <event    date="06282000"    type="REDY"
            itemid="4"/>
        <event    date="06302000"    type="SHIP"
            itemid="1"/>
        <event    date="06302000"    type="SHIP"
            itemid="2"/>
        <event    date="06302000"    type="SHIP"
            itemid="3"/>
        <event    date="06302000"    type="SHIP"
            itemid="4"/>
        <event date="07032000" type="BILL"/>
        <event date=" " type="PMNT"/>
      </log>
    </POSummary>
  <customerPurchaseOrder>
</customerPurchaseOrders>
```

APPENDIX A.21

Customer 1 Purchase Order Response

```
<!--Customer PO summary Doc, final order summary sent to
customer storeUSA-->
<customerPurchaseOrder>
    <PORequest           customerName="storeUSA"
        customerID="c1000001" date="06152000">
      <Item    id="1"    description="basketball"
        catalog_number="SPXB0001" quantity="10"/>
      <Item    id="2"    description="baseball"
        catalog_number="SPXB0002" quantity="120">
      <Item    id="3"    description="toaster    oven"
        catalog_number="APXH0001" quantity="6"/>
      <Item    id="4"    description="tv"
        catalog_number="APXH0002" quantity="12"/>
      <Item    id="5"    description="vcr"
        catalog_number="APXH0003" quantity="12"/>
    </PORequest>
    <POSummary           ordernumber="E0000001"
        status="BILL">
      <invoice date="07032000" total="1790">
        <Item    id="1"    description="basketball"
          catalog_number="SPXB0001"    quantity="10"
          unitprice="5"/>
        <Item    id="2"    description="baseball"
          catalog_number="SPXB0002"    quantity="120"
          unitprice="5"/>
        <Item    id="3"    description="toaster    oven"
          catalog_number="APXH0001" quantity="6" unit-
          price="10"/>
        <Item    id="4"    description="tv-19"
          catalog_number="APXH0002"    quantity="12"
          unitprice="60"/>
        <Item    id="5"    description="vcr"
          catalog_number="APXH0003"    quantity="12"
          unitprice="30"/>
      </invoice>
    </POSummary>
</customerPurchaseOrder>
```

APPENDIX A.22

Customer 2 Purchase Order Response

```
<!--Customer PO summary Doc, final order summary sent to
customer USA-mart-->
<customerPurchaseOrder>
    <PORequest           customerName="USA-mart"
        customerID="c1000002" date="06152000">
      <Item    id="1"    description="soccerball"
        catalog_number="SPXB0003" quantity="20"/>
      <Item    id="2"    description="bicycle"
        catalog_number="SPXB0004" quantity="10"/>
      <Item    id="3"    description="microwave    oven"
        catalog_number="APXH0004" quantity="6"/>
      <Item    id="4"    description="tv-19"
        catalog_number="APXH0002" quantity="6"/>
    </PORequest>
    <POSummary           ordernumber="E0000002"
        status="BILL">
      <invoice date="07032000" total="950">
        <Item    id="1"    description="soccerball"
          catalog_number="SPXB0003"    quantity="20"
          unitprice="8"/>
        <Item    id="2"    description="bicycle"
          catalog_number="SPXB0004"    quantity="10"
          unitprice="75"/>
        <Item    id="3"    description="microwave    oven"
          catalog_number="APXH0004" quantity="6" unit-
          price="60"/>
        <Item    id="4"    description="tv-19"
          catalog_number="APXH0002" quantity="6" unit-
          price="65"/>
      </invoice>
    </POSummary>
</customerPurchaseOrder>
```

What is claimed is:

1. A computer program product for automated e-business services, the computer program product embodied on one or more computer-readable media of a first computing system and comprising:

computer-readable program code to read a specification of an e-business service, wherein the specification is encoded in a structured markup language; and computer-readable program code to process the specification to carry out the e-business service, further comprising:

computer-readable program code to receive at least one input document for the e-business service, wherein the at least one input document is encoded in the structured markup language; and computer-readable program code to perform at least one of: transforming the input documents into other documents, according to transformation information that may be provided in the specification, and operating upon the input documents or the other documents to create one or more new documents, according to operating actions that may be provided in the specification.

2. The computer program product according to claim 1, further comprising computer-readable program code to forward the other documents or the new documents to a computing system other than the first computing system.

3. The computer program product according to claim 1, wherein the other documents and the new documents are encoded in a structured markup language.

4. The computer program product according to claim 1, wherein the structured markup language is a language known as "the Extensible Markup Language (XML)" or a derivative thereof.

5. The computer program product according to claim 1, wherein the computer-readable program code to operate upon the input documents or the other documents further comprises:
   computer-readable program code to invoke one or more software-implemented processes; and
   computer-readable program code to coordinate results of the invocations.

6. The computer program product according to claim 5, further comprising computer-readable program code to repetitively execute the computer-readable program code to process, until reaching a final result of the e-business service, wherein the other documents, the new documents, or the coordinated results or the invocations now function as the input documents.

7. A system for automated e-business services, comprising:
   means for reading a specification of an e-business service, wherein the specification is encoded in a structured markup language; and
   means for processing the specification to carry out the e-business service, further comprising:
      means for receiving at least one input document for the e-business service, wherein the at least one input document is encoded in the structured markup language; and
      means for performing at least one of: transforming the input documents into other documents, according to transformation information that may be provided in the specification, and operating upon the input documents or the other documents to create at least one new document, according to operating actions that may be provided in the specification.

8. The system according to claim 7, further comprising means for forwarding the other documents or the new documents to a computing system other than the first computing system.

9. The system according to claim 7, wherein the other documents and the new documents are encoded in a structured markup language.

10. The system according to claim 7, wherein the structured markup language is a language known as "the Extensible Markup Language (XML)" or a derivative thereof.

11. The system according to claim 7, wherein the means for operating upon the input documents or the other documents further comprises:
   means for invoking at least one software-implemented process; and
   means for coordinating results of the invocations.

12. The system according to claim 11, further comprising means for repetitively executing the means for processing, until reaching a final result of the e-business service, wherein the other documents, the new documents, or the coordinated results of the invocations now function as the input documents.

13. A method comprising:
   reading a specification of an e-business service, wherein the specification is encoded in a structured markup language; and
   processing the specification to carry out the e-business service, further comprising:
      receiving at least one input document for the e-business service, wherein the at least one input document is encoded in the structured markup language; and
      performing at least one of: transforming the input documents into other documents, according to transformation information that may be provided in the specification, and operating upon the input documents or the other documents to create at least one new document, according to operating actions that may be provided in the specification.

14. The method according to claim 13, further comprising forwarding the other documents or the new documents to a computing system other than the first computing system.

15. The method according to claim 13, wherein the other documents and the new documents are encoded in a structured markup language.

16. The method according to claim 13, wherein the structured markup language is a language known as "the Extensible Markup Language (XML)" or a derivative thereof.

17. The method according to claim 13, wherein operating upon the input documents or the other documents further comprises:
   invoking at least one software-implemented process; and
   coordinating results of the invocations.

18. The method according to claim 17, further comprising repetitively executing processing the specification to carry out the e-business service, until reaching a final result of the e-business service, wherein the other documents, the new documents, or the coordinated results of the invocations now function as the input documents.

19. A method of conducting business by using automated e-business services, comprising:
   reading a specification of an e-business service, wherein the specification is encoded in a structured markup language; and
   processing the specification to carry out the e-business service, further comprising:
      receiving at least one input document for the e-business service, wherein the at least one input document is encoded in the structured markup language; and
      performing at least one of: transforming the input documents into other documents, according to transformation information that may be provided in the specification, and operating upon the input documents or the other documents to create at least one new document, according to operating actions that may be provided in the specification.

20. A method of defining e-business process and data interactions, further comprising:
   defining data inputs to be used by an e-business service;
   defining interactions to be carried out when operating the e-business service;
   specifying details of the data inputs in a structured markup language syntax;
   specifying details of the interactions in the structured markup language syntax; and
   creating at least one e-business service definition document separate from at least one input document containing the data inputs wherein the specified details of the data inputs and the specified details of the interactions are recorded in the at least one e-business service definition document.

21. The method according to claim 20, wherein the structured markup language is a language known as "the Extensible Markup Language (XML)" or a derivative thereof.

22. A method of defining process and data interactions for an application described by a finite state machine, comprising:
   defining data inputs to be used by the application;

defining interactions to be carried out when operating the application;

specifying details of the data inputs in a structured markup language syntax;

specifying details of the interactions in the structured markup language syntax; and creating at least one application definition document separate from at least one input document containing the data inputs wherein the specified details of the data inputs and the specified details of the interactions are recorded in the at least one application definition document.

23. The method according to claim 22, wherein the structured markup language is a language known as "the Extensible Markup Language (XML)" or a derivative thereof.

24. A method for automating data and process interactions between a first application and one or more other applications, comprising:

providing at least one application definition document encoded in a structured markup language, wherein the application definition documents specify the interactions and at least one data input to be used in the interactions, and wherein details of the specified interactions and data inputs are specified in the structured markup language; and processing the application definition documents to carry out the data and process interactions in response to receiving at least one separate input document containing the at least one data input.

25. The method according to claim 24, wherein processing the application definition documents further comprises:

receiving at least one input document to be used by the interactions; and performing at least one of: transforming the input documents into other documents, according to transformation information that may be provided in the application definition documents, and operating upon the input documents or the other documents to create at least one new document, according to operating actions that may be provided in the application definition documents.

26. The method according to claim 24, wherein the structured markup language is a language known as "the Extensible Markup Language (XML)" or a derivative thereof.

* * * * *

UNITED STATES PATENT AND TRADEMARK OFFICE
CERTIFICATE OF CORRECTION

PATENT NO. : 7,634,726 B2  Page 1 of 1
APPLICATION NO. : 09/754891
DATED : December 15, 2009
INVENTOR(S) : Ims et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2842 days.

Signed and Sealed this

Ninth Day of November, 2010

David J. Kappos
*Director of the United States Patent and Trademark Office*